United States Patent
Schneck et al.

(10) Patent No.: US 6,865,426 B1
(45) Date of Patent: *Mar. 8, 2005

(54) ADAPTIVE DATA SECURITY SYSTEMS AND METHODS

(75) Inventors: Phyllis A. Schneck, Atlanta, GA (US); Karsten Schwan, Tucker, GA (US); Santosh Chokhani, Arlington, VA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/514,119

(22) Filed: Feb. 28, 2000

Related U.S. Application Data

(60) Provisional application No. 60/063,551, filed on Oct. 28, 1997.

(51) Int. Cl.[7] .......................... G05B 15/02; G05B 19/18
(52) U.S. Cl. ..................... 700/9; 700/7; 700/8; 700/67; 700/68; 709/213; 709/229; 709/230; 713/186; 713/187; 713/188; 713/201; 370/246; 370/352; 370/389
(58) Field of Search ................................ 713/201, 164, 713/165, 151, 166, 200; 700/9

(56) References Cited

U.S. PATENT DOCUMENTS

| | | | | |
|---|---|---|---|---|
| 5,164,938 A | * | 11/1992 | Jurkevich et al. | 370/231 |
| 5,477,531 A | * | 12/1995 | McKee et al. | 370/249 |
| 5,689,566 A | * | 11/1997 | Nguyen | 713/155 |
| 5,793,763 A | * | 8/1998 | Mayes et al. | 370/389 |
| 5,935,248 A | * | 8/1999 | Kuroda | 713/201 |
| 6,108,583 A | * | 8/2000 | Schneck et al. | 700/9 |
| 6,257,486 B1 | * | 7/2001 | Teicher et al. | 235/380 |
| 6,510,349 B1 | * | 1/2003 | Schneck et al. | 700/9 |

* cited by examiner

*Primary Examiner*—Ayaz Sheikh
*Assistant Examiner*—Kaveh Abrishamkar
(74) *Attorney, Agent, or Firm*—Thomas, Kayden, Horstemeyer, & Risley

(57) ABSTRACT

The present disclosure relates to a method for communicating and applying adaptive security to a data stream comprising a plurality of data packets. The method comprises the steps of identifying a desired security level range and a desired actual security level which falls within the desired security level range. The availability of a number of security processor operations at the host is determined so that, if needed, computing resources at the host can be reallocated to ensure that the data stream can be verified at the desired actual security level. If there are not sufficient resources available for reallocation at the host, communication resources can be reallocated, for example by changing the bandwidth of the data stream or another incoming data stream. With this method, the actual security level will be kept within the desired security level range.

31 Claims, 13 Drawing Sheets

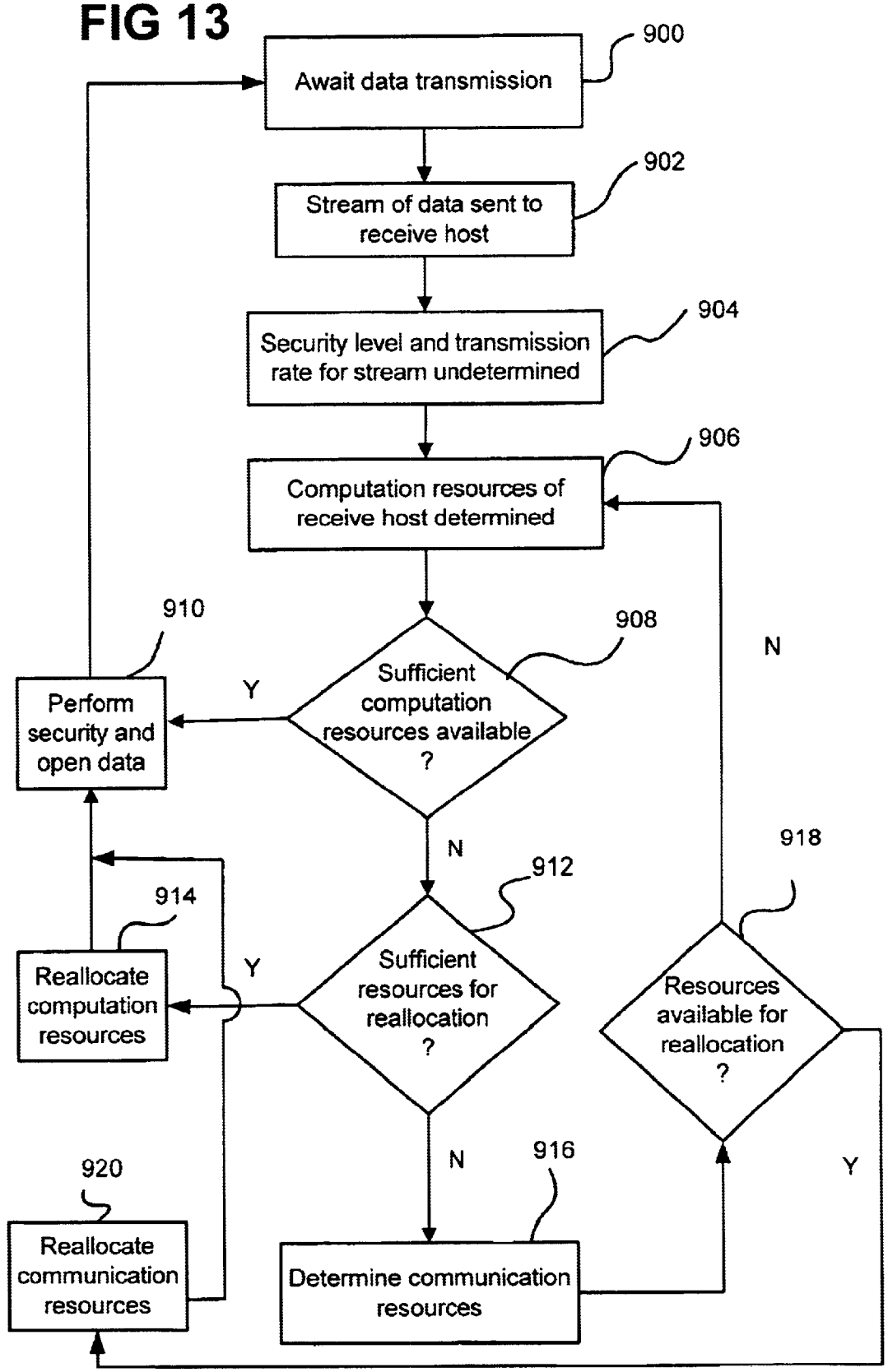

ADAPTIVE DATA SECURITY SYSTEMS AND METHODS

CROSS-REFERENCE TO RELATED APPLICATIONS

This application claims priority to and the benefit of U.S. Provisional Patent Application Ser. No. 60/063,551, filed Oct. 28, 1997 now abandoned, and U.S. patent application Ser. No. 09/181,304, both of which are incorporated herein by reference.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of DAAH04-96-1-0209 awarded by the U. S. Department of Defense.

TECHNICAL FIELD

The present invention is generally related to the field of data communications and, more particularly, is related to systems and methods for securing data communication.

BACKGROUND

Private and/or sensitive data is being transmitted electronically over various media with increasing frequency. As the frequency of these transmissions increase, the need for security for this data likewise increases. For this reason, various security measures have been developed to defeat attempts to intercept and/or tamper with such data. As known in the art, the stronger (and therefore potentially more effective) these measures are, the more computing overhead that is required and, therefore, the more computing power that is needed to send and receive the secured information.

Due to the ever increasing demands on sending and receiving hosts, the security operations required by either the sender or the receiver can overtax system resources. For instance, if a stream of video packets is sent over the Internet to a receive host with strong security, data (e.g., individual video frames) can be lost if the receive host lacks the computing power to process the stream and its accompanying security, resulting in a choppy video sequence and/or the loss of some measure of security.

As a result of the increase in complexity of such security measures, a large body of work is currently being performed in an effort to shift the emphasis of connection management from static allocation to more dynamic methods. The development of connection-oriented platforms such as asynchronous transfer mode (ATM) has driven many of these efforts. For example, the Tenet group's Dynamic Connection Management (DCM) scheme provides dynamic modification of the service parameters using network support.

Also participating in the movement toward more dynamic allocation are Bansal et al. who developed an ATM Service Manager (ASM), which is intended to provide dynamic renegotiation, traffic behavior characterization, and communication with other ASM's. The ASM is designed specifically for use over ATM, however, does not include algorithms to determine when to renegotiate, nor performance results to evaluate the system.

Another recent development is SECMPEG which has some parallels with Authenticast in that it offers varied levels of security for encrypted MPEG. SECMPEG includes the capability to encrypt only the most important and significant data in order to obtain improved performance. However, SECMPEG does not address both when and how to apply security, as well as the general issue of asymmetric end host processing loads. In addition, the SECMPEG security levels are based on the types of MPEG frames encrypted and therefore are somewhat limited in application.

Varied levels of security are also employed an the MPEG player described by Campbell et al. This player weighs security versus performance, yet only focuses on encryption to the exception of authentication.

One application which is particularly challenging in terms of providing security for data transmissions is wireless transmissions such as air traffic control (ATC) transmissions. Providing strong security for such transmissions can be difficult in that the communication channels, and therefore the available bandwidth for transmissions, frequently changes. If the only channel available to a particular stream of data is of a higher bandwidth than can be maintained by the current security status, an increased security risk can occur if the computation resources are not used more efficiently through some resource reallocation or application of adaptive security techniques. Therefore, an adaptive data security system operating in such a context must be able to adapt quickly to such bandwidth fluctuations, or risk the loss of data and/or security levels.

The provision of security for ATC transmissions is also difficult because data exchange in this context is often more sporadic and typically involves shorter messages. Where fixed-size security headers are used, these shorter message sizes result in greater amounts of security that must be processed. This, in turn, increases the amount of computing power needed to send the data to the receive host (e.g., plane or control tower). Unfortunately, the computing power of the send host and receive host is limited. Again, this can lead to lost and/or unsecured data. Therefore, an adaptive data security system ideally is dynamic enough to adapt in instances in which the computing power alone is not sufficient, even after resource reallocation, to provide the necessary computing power.

From the foregoing, it can be appreciated that it would be desirable to have adaptive data security systems and methods which do not possess the drawbacks described above.

SUMMARY OF THE INVENTION

The present disclosure relates to a method for communicating and applying adaptive security to a data stream comprising a plurality of data packets. The method comprises the steps of identifying a desired security level range and a desired actual security level which falls within the desired security level range for the data stream to be received by a host, determining the availability of a number of security processor operations at the host, reallocating computing resources at the host if the data stream cannot be verified at the desired actual security level, reallocating communication resources if there are insufficient computing resources available for reallocation at the host, and verifying the data packets at the actual security level, the actual security level being within the desired security level range.

In one embodiment, this method can be practiced with a system for facilitating data communication to a host with adaptive security. The system comprises means for determining whether a desired actual security level for a transmitted data stream falls within a desired security level range, means for determining the availability of a number of security processor operations at the host, means for reallocating computing resources at the host if the data stream cannot be verified at the desired actual security level; means for reallocating communication resources if there are insufficient computing resources available for reallocation at the host.

In addition, the present disclosure relates to a computer program embodied on a computer-readable medium for facilitating data communication to a host with adaptive security. The computer program comprises logic configured to determine whether a desired actual security level for a transmitted data stream falls within a desired security level range, logic configured to determine the availability of a number of security processor operations at the host, logic configured to reallocate computing resources at the host if the data stream cannot be verified at the desired actual security level, and logic configured to reallocate communication resources if there are insufficient computing resources available for reallocation at the host.

The features and advantages of the present invention will become apparent to one having ordinary skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 13 is a flow chart illustrating an adaptive security method of the second embodiment in which both computation and communication resources are monitored and/or controlled to ensure a requisite level of transmission security.

DETAILED DESCRIPTION

Figure 1:
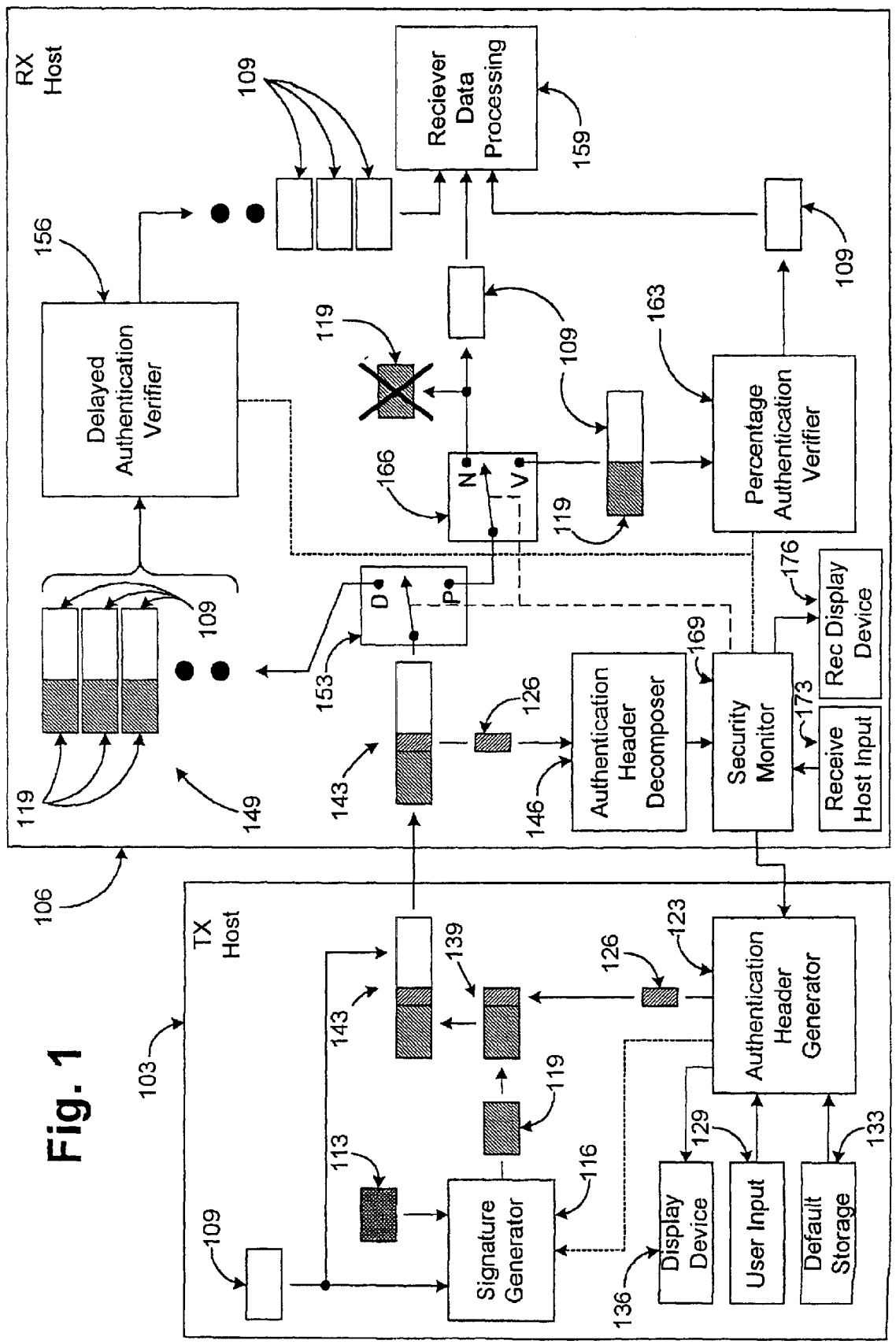
FIG. 1 is a functional block diagram of a first embodiment of a data security system constructed in accordance with the principles of the present invention.

As an initial matter, it is to be understood that the term "security operations" as used herein pertain to both authentication and encryption. Referring now in more detail to the drawings, in which like numerals indicate corresponding parts throughout the several views, FIG. 1 illustrates a functional block diagram of a first embodiment of an authentication system 100 constructed in accordance with the principles of the present invention. The authentication system 100 includes at least one send host 103 and a receive host 106. Although only a single send host 103 is shown, it is to be understood that multiple send hosts 103 may communicate with the receive host 106, the single send host 103 being shown for purposes of the following discussion. Likewise, the single send host 103 may communicate with multiple receive hosts 106, the single receive host 106 being shown for purposes of the following discussion as well. Additionally, multiple send hosts 103 may communicate with multiple receive hosts 106.

The send host 103 generates a data block 109 or receives the data block 109 from a separate source to be communicated to the receive host 106. Generally, the data block 109 is of a predetermined length and may be formed, for example, from a continuous data stream or data file received by the send host 103. The data block 109 is formed as the data payload in a packet to be communicated to the receive host 106 as will be discussed.

The data block 109 may include any type of data such as, for example, but not limited to, audio, video, or other electronic data. The send host 103 also includes a key 113 which may be a block of data of predetermined length as is known in the art. The key 113 may be a private key for signing the data, or a public key for encrypting the data as known in the art. Note that other keys may be employed to accommodate different authentication or encryption algorithms.

The send host 103 includes a signature generator 116 which generates a signature block 119 from the data block 109 and the key 113 using a predetermined security algorithm which may be, for example, but not limited to, a security algorithm such as the Digital Signature Algorithm (DSA), the Rivest-Sharnir-Adleman (RSA) algorithm, or secret key authentication, which are generally known in the art.

The send host 103 also includes an authentication header generator 123, which generates an authentication header 126. The authentication header 126 includes various data fields, such as, for example, an authentication sequence number, data frame size, frame type, security algorithm, verification type, minimum security level, target security level, and an actual security level. The receive host 106 employs these data fields to generate an actual security configuration to achieve authentication of a data stream communicated from the send host 103. The actual security configuration is dynamic in that it may be changed by either the send host 103 or the receive host 106 during the course of data communication therebetween in response to user or application requirements, or changes in computer resource availability as will be discussed.

The authentication header generator 123 may receive a desired security configuration from the user input 129 or a default desired configuration may be received from a default storage 133 for a particular data stream. The desired security configuration is displayed on a display device 136 along with the actual security configuration which may ultimately be determined by the receive host 106 depending upon the specific desired security configuration specified by the user. Upon system startup, the default desired security configuration is obtained from the default storage 133 and displayed on the display device 133. A user may then alter the desired security configuration via the user input 129.

The authentication header generator 123 generates the authentication header 126, which contains the actual security configuration to be placed in an authentication data block 139. Together, the data block 109 and the authentication data block 139 make up a data packet 143 which is communicated to the receive host 106. The data stream is thus a continuous stream of "signed" data packets 143, each data packet 143 containing an authentication data block 139 with an authentication header 126 and a signature block 119. It may also be possible, however, that the data stream may only contain a predetermined percentage of "signed" data packets 143 as desired by the user. The security configuration identified in the authentication header 126 is initially determined from the desired security specification and may be altered based on feedback received from the receive host 106. Note that the user may alter the desired security specification after data communication is commenced between the send host 103 and the receive host 106. The receive host 106 may also alter the actual security configuration based on the operating state of the receive host 106, the altered security configuration being displayed to the user on the display device 133.

The receive host 106 receives the data packet 143 and the authentication header 126 is decomposed in an authentication header decomposer 146 in which the above stated fields are separated from the data packet 143 for use by the receive host 106. The receive host 106 then attempts to execute the desired security verification configuration contained in the authentication header 126. The receive host 106 may employ one of several verification types. Preferably, two specific verification types are used, namely, delayed authentication verification and percentage based verification, although other verification types may be employed as well.

When delayed authentication is employed, a predetermined number of signature blocks 119 and corresponding data blocks 109 from the data packets 143 received are collected in a bundle 149 as indicated by a first functional switch 153 which is placed in the D position. Thereafter, the delay authentication verifier 156 operates on the bundle 153 and verifies the data blocks 109 contained therein together using appropriate hashing functions known by those skilled in the art. Delayed verification will verify one hundred percent of the data packets. Once verified, the data blocks 119 are then provided to the receive data processor 159 for further processing according to the specific application. Delayed authentication is almost always available as a verification option, even when security processing resources are limited as delayed authentication exploits hashing techniques that reduce a large amount of data to a relatively small amount which can be verified rather quickly. However, there is a greater probability of processing delay due to data corruption as many data blocks are verified at once, which means that a single corrupted data block would require the entire data block to be retransmitted for verification.

When percentage based verification is employed, a predetermined percentage of signature blocks 119 and corresponding data blocks 109 from the data packets 143 are accessed by a percentage authentication verifier 163 as indicated by the first functional switch 149 being placed in the P position. A second functional switch 166 provides access to a particular signature block 119 and corresponding data block 109 upon which verification is performed when in the V position. Otherwise, when the second functional switch 166 is in the N position, the data block 109 is passed on to the receive data processor 159 without verification, the signature block 119 being discarded as shown. After a particular data block is verified by the percentage authentication verifier 163, the verified data block 109 is provided to the receive data processor for further processing according to the specific application. Note that the frequency or actual security level at which the second functional switch 166 provides access to the signature blocks 119 and corresponding data blocks 109 is determined by the security monitor 169. Generally, the security levels as discussed herein refer to the percentage of verified data packets in the receive host 106. The security monitor 169 also determines the verification type as indicated by the first functional switch 153, as well as the specific security algorithm employed by both the delayed authentication verifier 156 and the percentage authentication verifier 163.

The security monitor 169 attempts to specify an actual verification type, actual security algorithm, and an actual security level according to the desired security configuration received from the send host 103. However, the receive host 106 may not have enough processor time or security operations per second (SOPS) to provide the desired security configuration due to the verification of other data streams which currently employ much if not all of the SOPS available in the receive host 106 at a given moment. Consequently, the security monitor 169 may force a change in the verification type, security algorithm, and/or the actual security level that differs from the desired security configuration received by the send host 103 in order to accommodate the data stream.

In order to change the security algorithm employed, the security monitor 169 sends the new security algorithm to be employed to the send host 103 via a return path, the authentication header generator 123 implementing the new security algorithm while changing the authentication header to indicate the new security algorithm appropriately. The security algorithm is changed in this manner because the generation of the signature block 119 is performed by the send host 103.

Likewise, a change in the verification type is effected by the security monitor 169 by sending the new verification type to the send host 103 via the return path. The new verification type is then placed in the authentication header 126 by the authentication header generator 123. When a data packet 143 containing the new verification type reaches the receive host 103, then the security monitor causes the first functional switch 153 to move to the D position to employ delayed authentication verification in synch with the incoming data packets 143 earmarked for such verification type.

A change in the actual security level when percentage based verification is employed may occur in the receive host 106 or the send host 103. In the receive host 106, the actual security level is raised or lowered based upon the number of SOPS available in the receive host 106. It is understood that a lower security level requires a correspondingly lower number of SOPS to implement and vice versa. Note that the actual security level is not lowered below a predetermined minimum security level which is identified in the authentication header 126 so as to maintain a minimum amount of security. The actual security level determined by the security monitor 169 is communicated to the send host 103 for display on the display device 136.

The actual security level may be changed by the send host 103 by the user. Specifically, the user may adjust the actual security level via the user input 129. If the user adjusts the actual security level to a point which the receive host 106 is unable to maintain due to a lack of SOPS availability, the receive host 106 may generally react by switching to delayed verification in which one hundred percent of the data packets are verified as delayed verification can generally be performed with a minimal number of SOPS due to the hashing functions employed.

Note that when the receive host 106 alters any security parameter due to a lack of available SOPS, the receive host 106 may store the previous desired parameters in memory so that the receive host may revert back to the previous desired parameters when SOPS become available. These parameters may include, but are not limited to, the desired verification type and the desired security algorithm.

The receive host 106 includes a receive host input 173 in which a user may alter the actual security parameters manually. The receive host 106 displays the desired and actual security configuration on the receive display device 173 to be viewed by the user.

Note that the functionality of the send host 103 and the receive host 106 as described above and in the following discussion may be resident in a single computer system which may act as a send host 103 or a receive host 106 at any given time, depending upon whether the user is sending or receiving data. Further, a single computer system may simultaneously act as a send host 103 and a receive host 106 at the same time, communicating one or more data streams to a number of destination data endpoints and receiving one or more data streams from other origination data endpoints.

All of the above functionality discussed herein is implemented at a user/application level as known in the art which provides a distinct advantage as the present invention may be employed regardless of the underlying physical layer such as a network.

Figure 2:
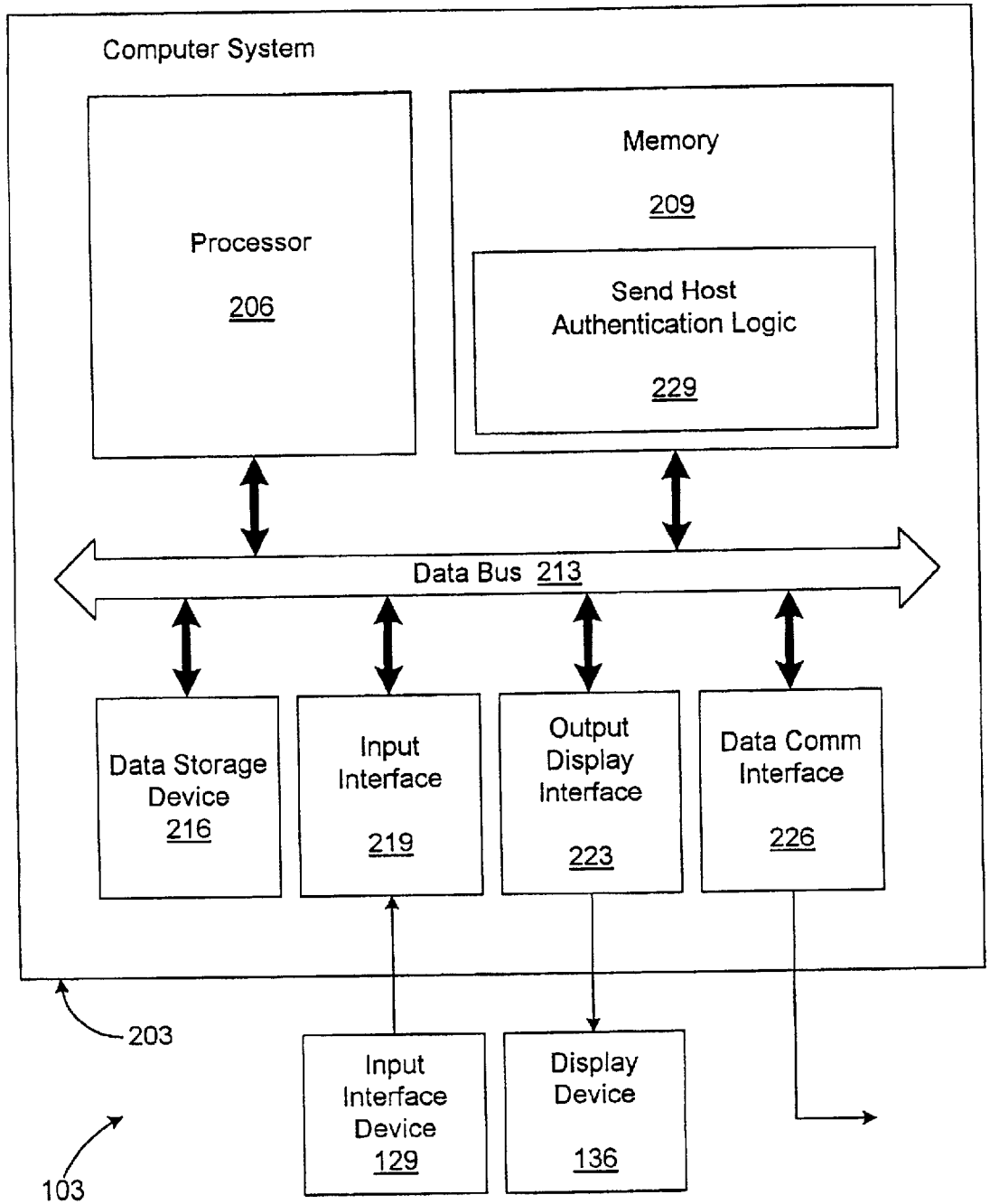
FIG. 2 is a block diagram of the send host of FIG. 1.

Referring next, to FIG. 2, shown is block diagram of the send host 103 according to an example embodiment of the present invention. The send host 103 includes a computer system 203 with a processor 206 and a memory 209 which are electrically coupled to a data bus 213. Also electrically coupled to the data bus 213 are a data storage device 216, an input interface 219, an output display interface 223, and a data communication interface 226. The input interface module 219 in turn is electrically coupled to a user input interface device 129 such as a keyboard, mouse, or other suitable device. Likewise, the output display interface 223 is electrically coupled to an output display device 136 such as a cathode ray tube (CRT) or suitable display device. The data storage device 216 may be a hard drive, floppy disk drive, fixed memory device, or other suitable means of data storage. The data communication interface 226 allows the send host 103 to communicate with the receive host 106 (FIG. 1) via a data communications channel (not shown). In performing the various tasks as discussed herein, the processor 206 operates according to the send host authentication logic 229 stored on the memory 209.

Figure 3:
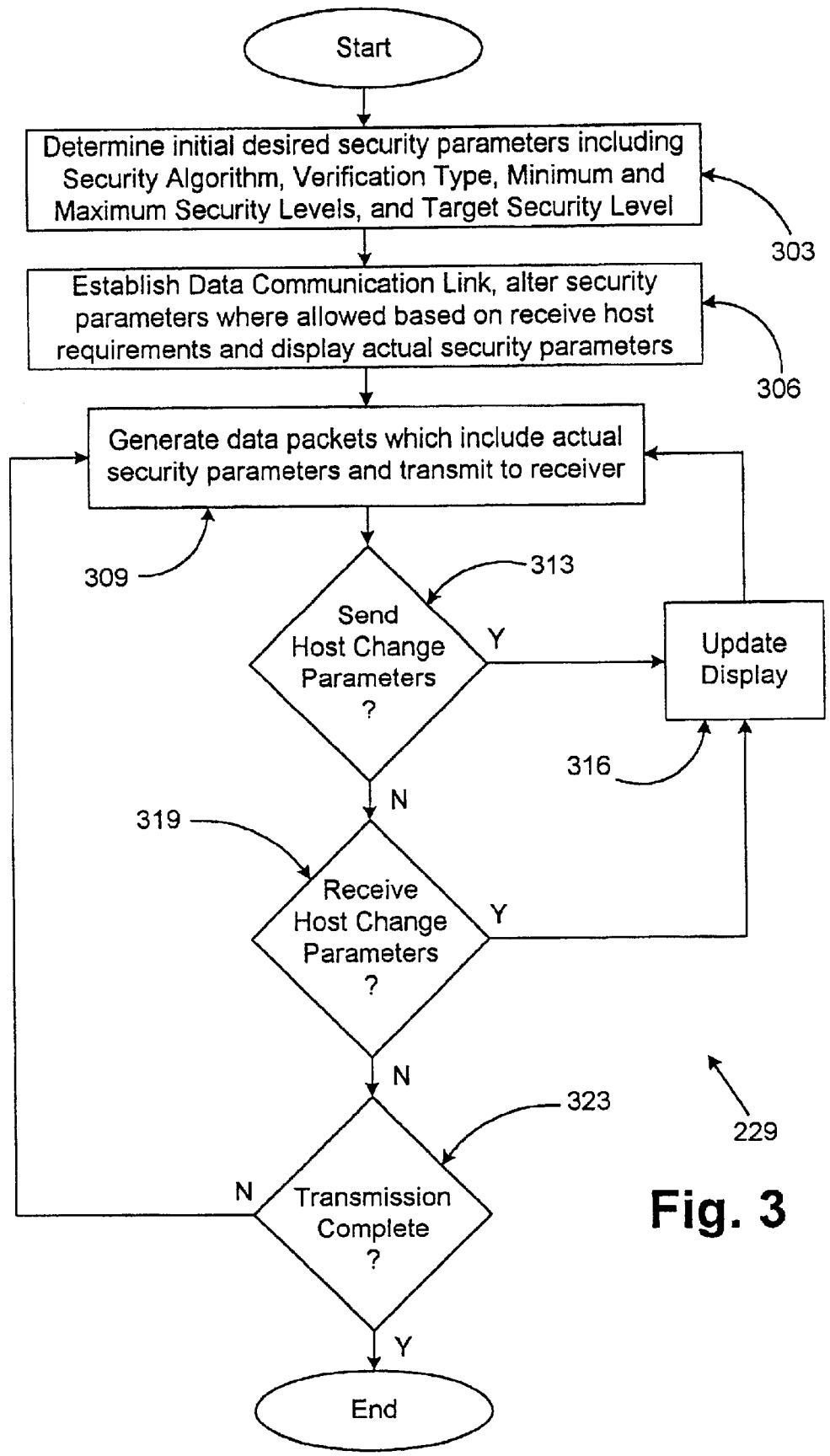
FIG. 3 is a flow chart showing the send host authentication logic of FIG. 2.

Turning next to FIG. 3, shown is flow chart which depicts the send host authentication logic 229. The send host authentication logic 229 begins with block 303 in which the desired security configuration is determined and displayed on the output display device 136 (FIG. 1). The desired security configuration may include the desired security algorithm, the desired verification type, the minimum security level, the target security level, and the actual security level. The actual security level may initially be set equal to the target security level until the receive host 103 alters the actual security level due to the lack of available processing resources to accomplish the target security level. These parameters may initially be read from a default security parameters file saved on the data storage device 216 (FIG. 2) or simply entered by the user via the user input interface device 129. Also, during startup, a data stream priority level is communicated from the send host 103 to the receive host 106 which is used by the receive host 106 in allocating processor resources or SOPS to the number of data streams received at any given moment. Note that the priority level may also be included as a data field in the authentication header 126 (FIG. 1) and may be altered by the user at the send host 103. The priority level is also displayed on the display device 136.

Next, in block 306, the send host 103 (FIG. 1) establishes a data communications link with the receive host 106 (FIG. 1) undergoing an initial training procedure in which the desired security parameters are communicated from the send host 103 to the receive host 106. The receive host 106 evaluates its capacity to verify the data packets 143 (FIG. 1) to be communicated according to the desired security configuration, and, if the receive host 106 has the necessary available SOPS, the verification of the data stream is performed according to the desired security configuration. If the requisite SOPS are not available, then the receive host 106 will determine and send an actual security configuration back to the send host 103 if the desired security configuration allows such parameters to be varied by the receive host 106. The actual security configuration may include, for example, the actual security algorithm, the actual verification type, and the actual security level. If the desired security configuration does not allow such changes, then the data link will be rejected by the receive host 106. The actual security parameters are then displayed on the output display device 130 (FIG. 2), if the data stream is accepted by the receive host 106.

The send host authentication logic 229 then progresses to block 309 in which the data packets 143 (FIG. 1) are assembled with the authentication data block 139 (FIG. 1) which includes the authentication header 126 (FIG. 1) and the signature block 119 (FIG. 1). The signature block 119 (FIG. 1) is generated using the actual security algorithm which is the same as the desired security algorithm specified in the desired security configuration unless altered by the receive host 106. The data packets 143 are communicated to the receive host 106.

Next in block 313, the send host authentication logic 229 determines whether the desired security configuration has been changed by the user via the user input interface device 129 (FIG. 2). If such a change has been made, then the send host authentication logic 229 progresses to block 316. If not, then the send host authentication logic 229 progresses to block 319. In block 319, the send host authentication logic 229 determines whether any of the actual security parameters have been changed by the receive host 319. If such a change has been made, then the send host authentication logic 229 moves to block 316. In block 316, the desired and actual security parameters displayed by the output display device 136 are altered to reflect any changes made. Thereafter, the send host authentication logic 229 reverts back to block 309 in which the data packets 143 are generated using the new security parameters. Preferably, the actual security level may be altered by the send host 103 as initiated by the user, for example, whereas the verification type and the security algorithm may not be changed by the send host 103 after the startup of data communication because the receive host 106 controls these parameters.

If in block 319, the receive host 106 does not change any of the actual security parameters, then the send host authentication logic 229 progresses to block 323 where it is determined whether the transmission of the data stream is complete. If the transmission is not complete, the send host authentication logic 229 reverts back to block 309 to continue to generate and communicate data packets. If the transmission of the data stream is complete in block 323, then the send host authentication logic 229 ends. Thus, the send host authentication logic 229 ultimately establishes an actual security configuration by which the data stream is communicated and reacts to any changes in the security parameters of the actual security configuration initiated by either the user or by the receive host 106. In this manner, the security configuration adapts over time to facilitate optimum data transmission speed while providing adequate security.

Figure 4:
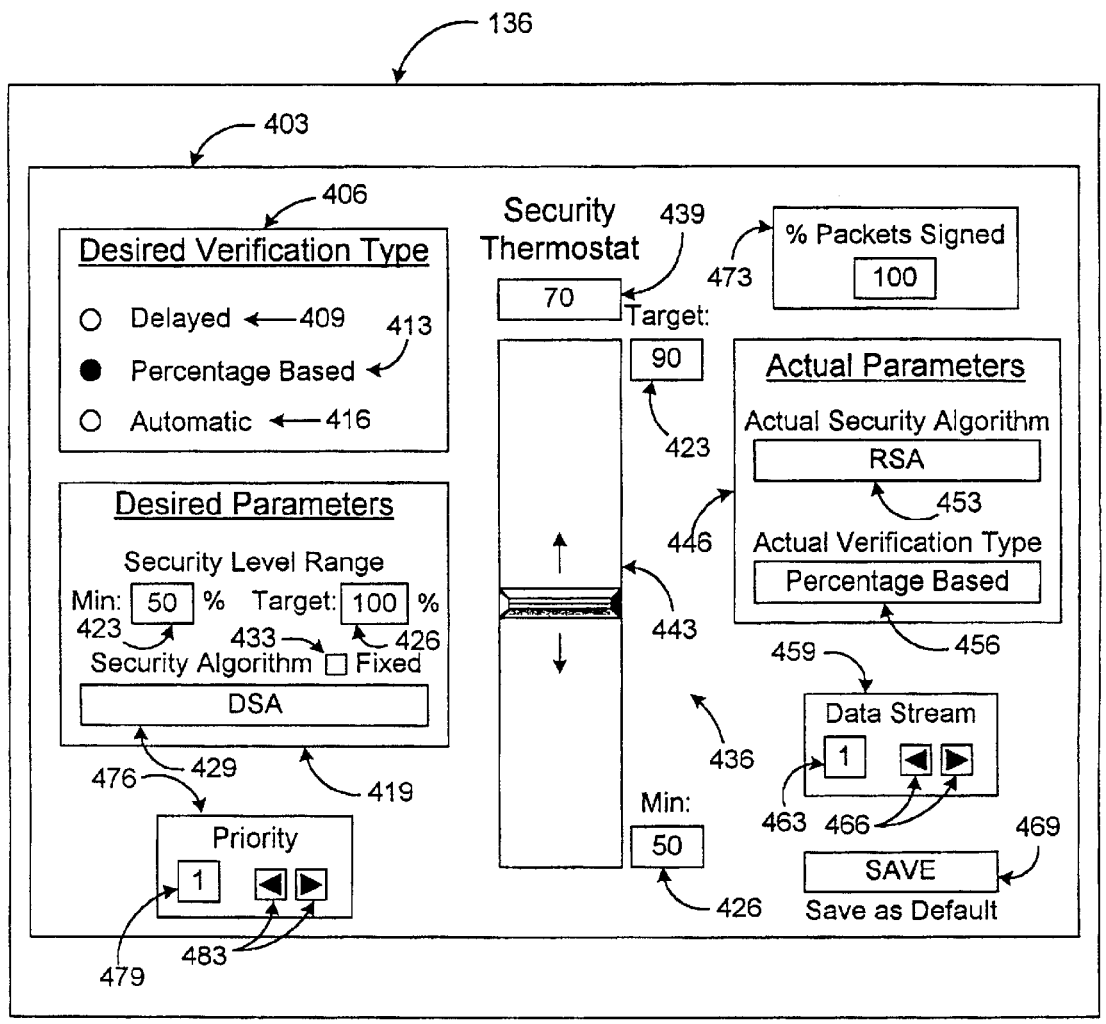
FIG. 4 is a drawing of the output display of FIG. 2.

With reference to FIG. 4, shown is an output display screen 403 appearing on the output display device 136, which may be a CRT, for example, or other suitable display device or devices. The output display screen 403 includes a desired verification type block 406 in which one may toggle between delayed verification 409, percentage based verification 413, and automatic verification 416. Where delayed verification 409 or percentage based verification 413 are chosen, the receive host (FIG. 1) is forced to employ the desired verification type chosen and may not switch to an alternative verification type. Where automatic verification 416 is chosen, the actual verification type can be determined by the receive host (FIG. 1) based on availability of SOPS, etc. Preferably, the receive host 106 will attempt to establish percentage based verification before delayed verification due to a greater reliability and a lesser susceptibility to delays, when the desired security configuration allows the receiver to select the verification type. Generally, delayed verification is employed when percentage based verification cannot be accommodated by the receive host 106.

The output display screen 403 also includes a desired parameters block 419 which displays a desired security level range which includes a minimum security level 423 and a target security level 426 which may be entered with the user input interface 129 (FIG. 2) such as a keyboard for example. The desired parameters block 419 also includes a desired security algorithm 429 and a fixed block 433. The desired parameters block 419 may offer a pull down list of security algorithms within which one may chose a particular algorithm to be employed. The fixed block 433 indicates whether the receive host 106 may specify an actual security algorithm other than that chosen by the user as indicated by the desired security algorithm 429.

The output display screen 403 also includes a security thermostat 436 which includes a slide control 443 that indicates the actual security level 439 between the minimum and target security levels 423 and 426. Note that the slide control may be moved up and down with, for example, a mouse which guides a pointer on the output display screen. Next to the security thermostat 436 is an actual parameters block 446 which shows an actual security algorithm 453 and an actual verification type 456. The actual security algorithm 453 and the actual verification type 456 are those dictated by the receive host 106 (FIG. 1) based on SOPS availability. If enough SOPS are available to implement the desired parameters, then the parameters in the actual parameters block 446 would mirror the desired parameters in the desired verification type block 406 and the desired parameters block 419.

In addition, the output display screen 403 features a data stream identifier block 459 in which includes a current data stream indicator 463 with toggle buttons 466. The toggle buttons 466 increase or decrease the value in the current data stream indicator 463. The current data stream indicator 463 indicates the particular data stream for which parameters are displayed on the output display screen 403 at a given time in which the send host 103 is communicating two or more data streams to two or more receive hosts 106.

The output display screen 403 includes a default configuration save button 469 which causes the current desired security parameters as reflected in the desired verification type block 406, the desired parameters block 419, and the security thermostat 436 to be saved to the data storage device 216. Preferably, this default configuration is employed whenever a new data stream is initiated, where the various default parameters may be altered as the user sees fit.

The output display screen further includes a packet signed percentage block 473 which indicates a percentage of data packets 109 (FIG. 1) for which a signature block 119 (FIG. 1) is generated. This value may be less than one hundred percent when processor resources are stressed in the send host 106 (FIG. 1), thereby reducing the demand for processor resources for the signature generation.

Finally, the output display screen features a priority selection block 476 with a priority indicator 479 and priority indicator toggle buttons 483. The priority of a particular data stream may be chosen by the user by manipulating the toggle buttons 483 with a button on a mouse (not shown). In this manner, one may alter the priority of the particular data stream.

Figure 5:
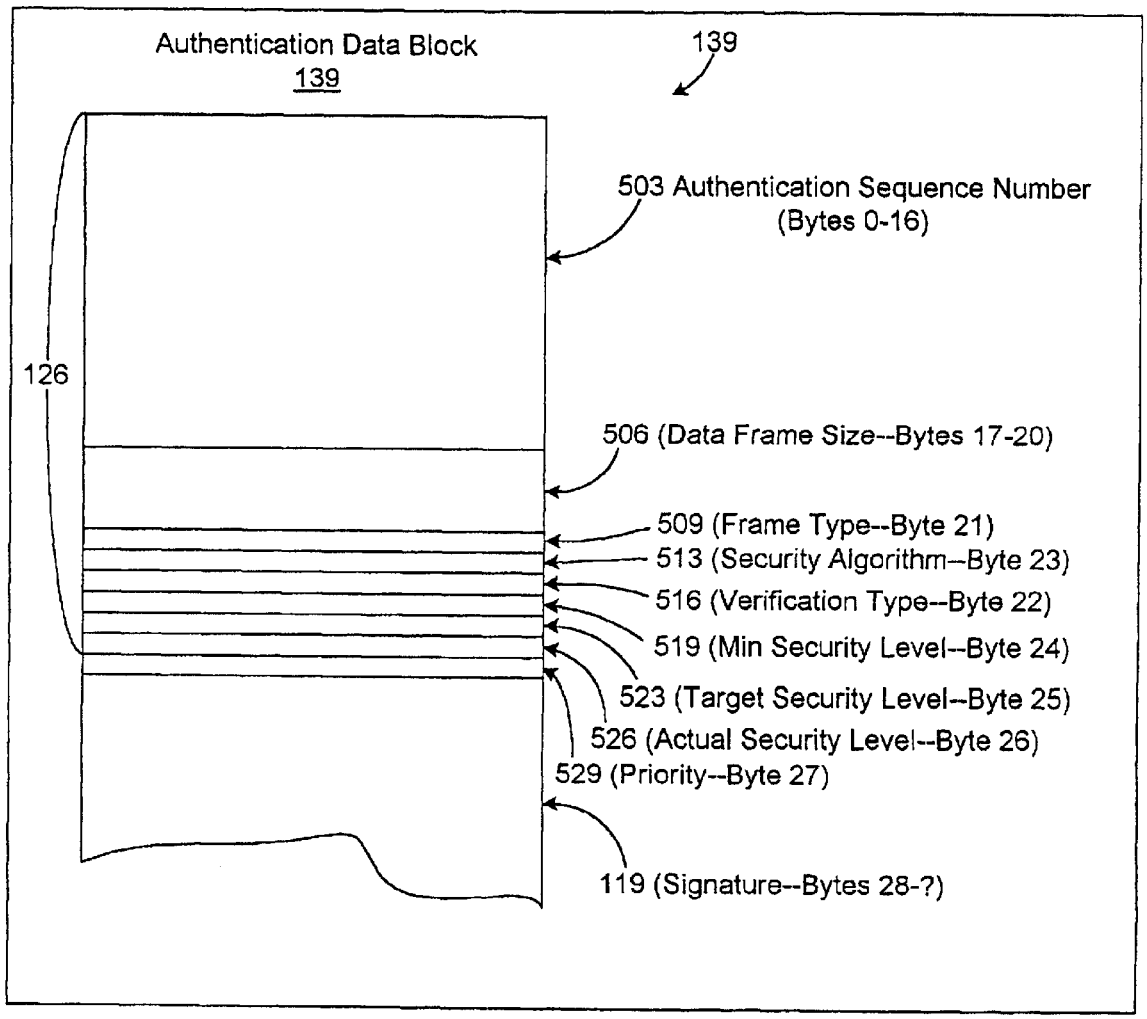
FIG. 5 is a drawing of an authentication data block generated by the send host of FIG. 2.

Turning then, to FIG. 5, shown is the authentication data block 139. The authentication data block 139 includes the authentication header 126 with various data fields to communicate the various security parameters discussed previously as well as additional parameters. It is understood that the particular order and size of the data fields as shown herein is as an example as other sizes and orders may be employed. The authentication header 126 includes an authentication sequence number field 503 which uses bytes 0–16. The authentication sequence number field 503 is employed to keep track of the order in which data packets are authenticated and received. Next, a data frame size field 506 occupying bytes 17–20 is specified which indicates the size of the authentication data block 139. A frame type field 509 which occupies the $21^{st}$ byte is specific to an encoding employed, for example, I, B, or P frames as in MPEG encoding, which is known in the art.

Next, a security algorithm field 513 is specified in byte 23 which indicates the actual security algorithm 513 employed by the receive host 106 (FIG. 1). In byte 24 is a verification type field 516 which indicates the actual verification type employed by the receive host 106. In byte 25, a security level minimum field 519 is defined which indicates the minimum security level or verification percentage to be performed by the receive host 106. Note that the minimum security level can not be changed by the receive host 106 so that a minimum level of verification is maintained as desired by the user. Next is a target security level field 523 which occupies byte 25 and specifies the target security level. The target security level is set by the send host 103 while the receive host 106 attempts to meet this level. The target security level field 523 is followed by an actual security level field 526 which occupies byte 26 of the authentication data block 139. The actual security level 526 may be determined by the receive host 106 in light of available processor resources, or the user at the send host 103 may manually change the actual security level 526 via the security thermostat 436. Byte 27 is occupied by a priority field 529 which holds the actual priority assigned to the data stream. Finally, the signature block 119 follows the priority field 529 and is of variable length depending upon the particular security algorithm employed.

Figure 6:
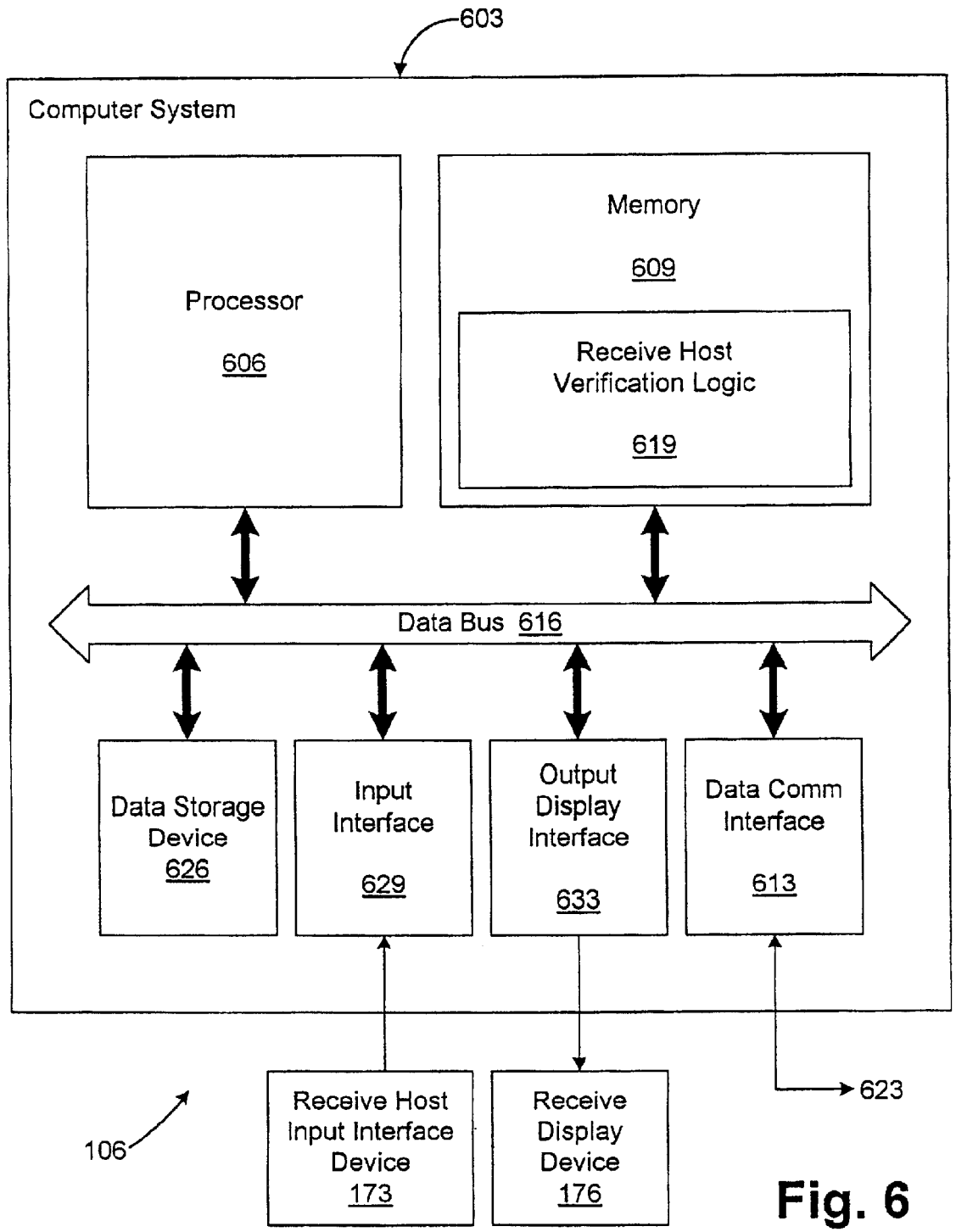
FIG. 6 is block diagram of the receive host of FIG. 1.

Turning next to FIG. 6, shown is a block diagram of the receive host 106 (FIG. 1). The receive host 106 is comprised of a computer system 603 which includes a processor 606, a memory 609, and a data communication interface 613. The processor 606, memory 609, and data communication interface 613 are all electrically coupled to a data bus 616. The processor 606 operates according to receive host verification logic 619 stored on the memory 609. The data communication interface 613 is adapted to be electrically coupled to a number of channels 623 through which the receive host 106 may communicate with any number of send hosts 103. The receive host 106 further includes a data storage device 626, an input interface 629, and an output display interface 633, all of which are electrically coupled to the data bus 616. The input interface 629 is also electrically coupled to receive host input interface device 173 such as a keyboard or mouse. Similarly, the output display interface 633 is electrically coupled to the receive display device 176 which may be a CRT or other similar device. The receive display device 176 features the output display screen 403 (FIG. 4) to inform the end user of the operation of the receive host 106.

Figure 7:
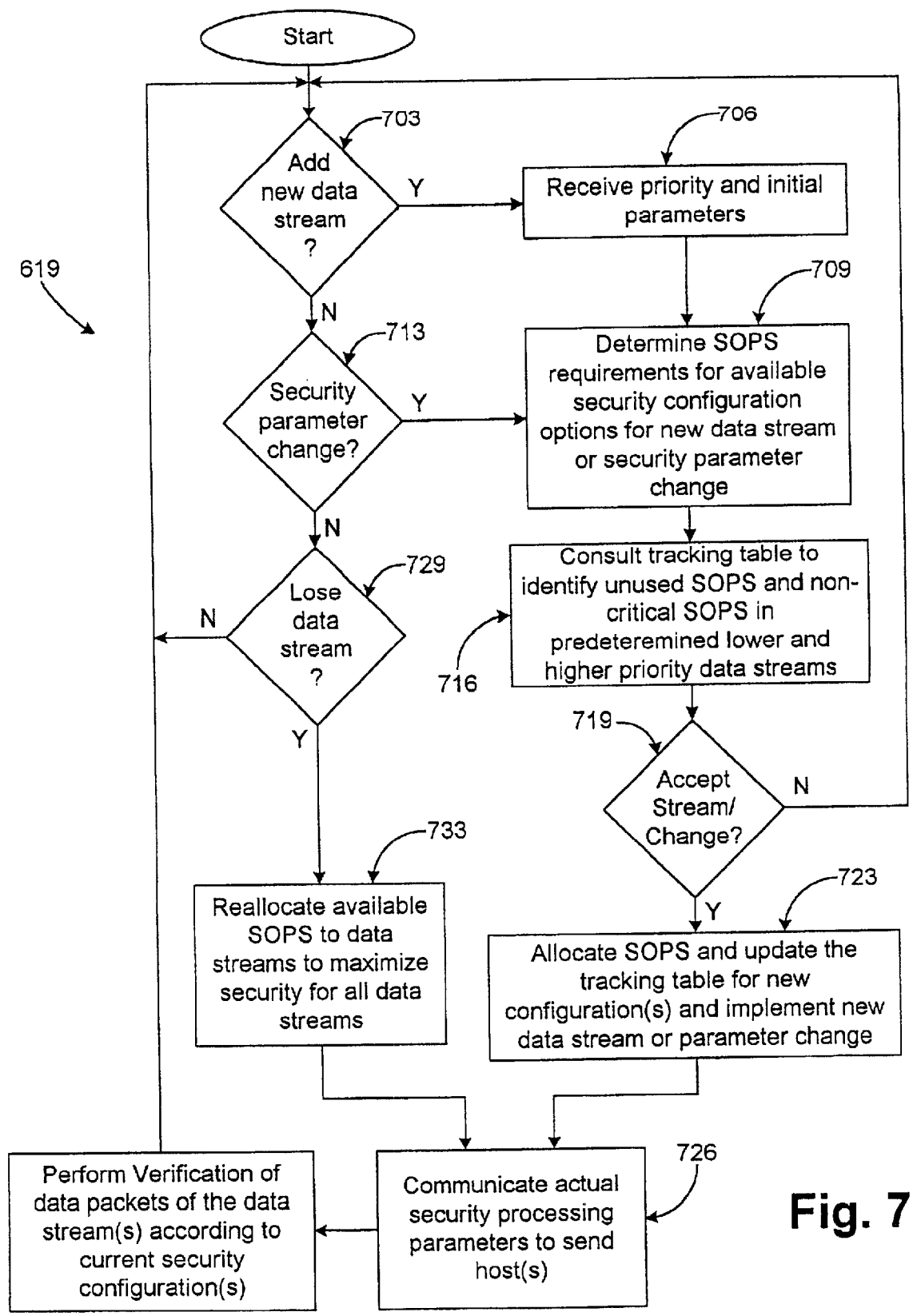
FIG. 7 is a flow chart showing the receive host authentication logic of FIG. 6.

Referring to FIG. 7, shown is a flow chart which depicts the receive host verification logic 619. The receive host verification logic 619 begins with block 703 in which it is ascertained whether a particular send host 103 (FIG.1) is attempting to establish secure data communication with the receive host 106 (FIG. 1). If so, the receive host verification logic 619 progresses to block 706 in which in which the receive host 106 is provided with the priority value for the data stream and the desired parameters including the security algorithm, verification type, minimum and target security levels, and an initial actual security level which may equal, for example, the target security level. Thereafter, the receive host verification logic 619 proceeds to block 709.

If in block 703 there is no new data stream to be received, then the receive host verification logic 619 proceeds to block 713 in which it is determined if any of the desired security parameters, specifically the actual security level, has been changed by the user at the send host 103. If any security parameters have changed, then the receive host verification logic 619 moves to block 709.

In block 709, the receive host verification logic 619 evaluates either the potential new data stream based on the parameters received in block 706, or the change in the actual security level or other security parameters detected in block 713 to determine how many SOPS are required by the new data stream or the security parameter change in an existing data stream. Generally, such information is stored in a tracking table in the memory 609 that may include values which indicate the data stream priority, an amount of SOPS necessary to maintain the minimum security level, the amount of SOPS consumed to maintain the actual security level, and the amount of SOPS necessary to achieve the target security level for each existing data stream received by the receive host. The tracking table may also be stored on the data storage device 626 or other suitable storage device.

Thereafter, the receive host verification logic 619 progresses to block 716 where the tracking table is consulted to determine how many SOPS are available to accommodate the potential new data stream or the desired change in the actual security level. In particular, the receive host verification logic 619 identifies how many unused SOPS are available and how many non-critical SOPS may be diverted from the verification processing of other data streams to facilitate the potential new data stream or the change in the actual security level. Non-critical SOPS are those used to perform a percentage based verification at an actual security level which is greater than the minimum security level for a particular data stream. That is to say, non-critical SOPS may be diverted from the verification processing of a particular data stream and the minimum security level can be maintained for that data stream.

The receive host verification logic 619 then progresses to block 719 in which it is determined whether there are enough unused SOPS and non-critical SOPS as indicated by the tracking table which may be diverted to accommodate the new data stream or the security parameter change. If such is the case, then the receive host verification logic 619 proceeds to block 723. If not, then the new data stream is rejected and/or the security parameter change is not implemented and the receive host verification logic 619 reverts back to block 703. For example, if one attempts to increase the actual security level by manipulating the security thermostat 436 (FIG. 4), then the receive host 106 will attempt to facilitate the increase in the actual security level. If the receive host 106 cannot achieve the higher security level using percentage based verification, then the receive host 106 may automatically switch the verification type to delayed verification to accommodate a security level of one hundred percent.

In block 723, the previously identified non-critical SOPS and any unused SOPS are diverted to accommodate the new data stream and/or the security parameter change. The tracking table is updated with the new allocation for each altered data stream including the new data stream if one is implemented. Thereafter, the receive host verification logic 723 progresses to block 726.

Referring back at block 713, if there is not change to the security parameters, then the receive host verification logic 619 proceeds to block 729 in which it is determined whether the communication of any current data stream has terminated. If such is not the case, then the receive host verification logic 619 reverts back to block 703. If a current data stream has ceased communication in block 729, then the receive host verification logic 619 progresses to block 733. In block 733, the SOPS which were employed in processing the now terminated data stream are reallocated to the existing data streams to maximize security for all of the data streams. Thereafter, the receive host verification logic 619 continues to block 726.

In block 726, the security parameters for all data streams which are new or altered due to the allocation or reallocation of the SOPS in blocks 723 and 733 are communicated to their respective send host(s) 103. Next, in block 736, the verification of the data packets of the current data streams are performed according to the security parameters determined for each data stream. Thereafter, the receive host verification logic 619 reverts back to block 703.

Note that the receive host verification logic 619 operates in a continuous loop searching for changes in the status quo of the processing of the data streams and reacts to changes by either reallocating processor resources (SOPS) to accommodate a change, or rejecting such changes altogether and maintaining the status quo.

Figure 8:
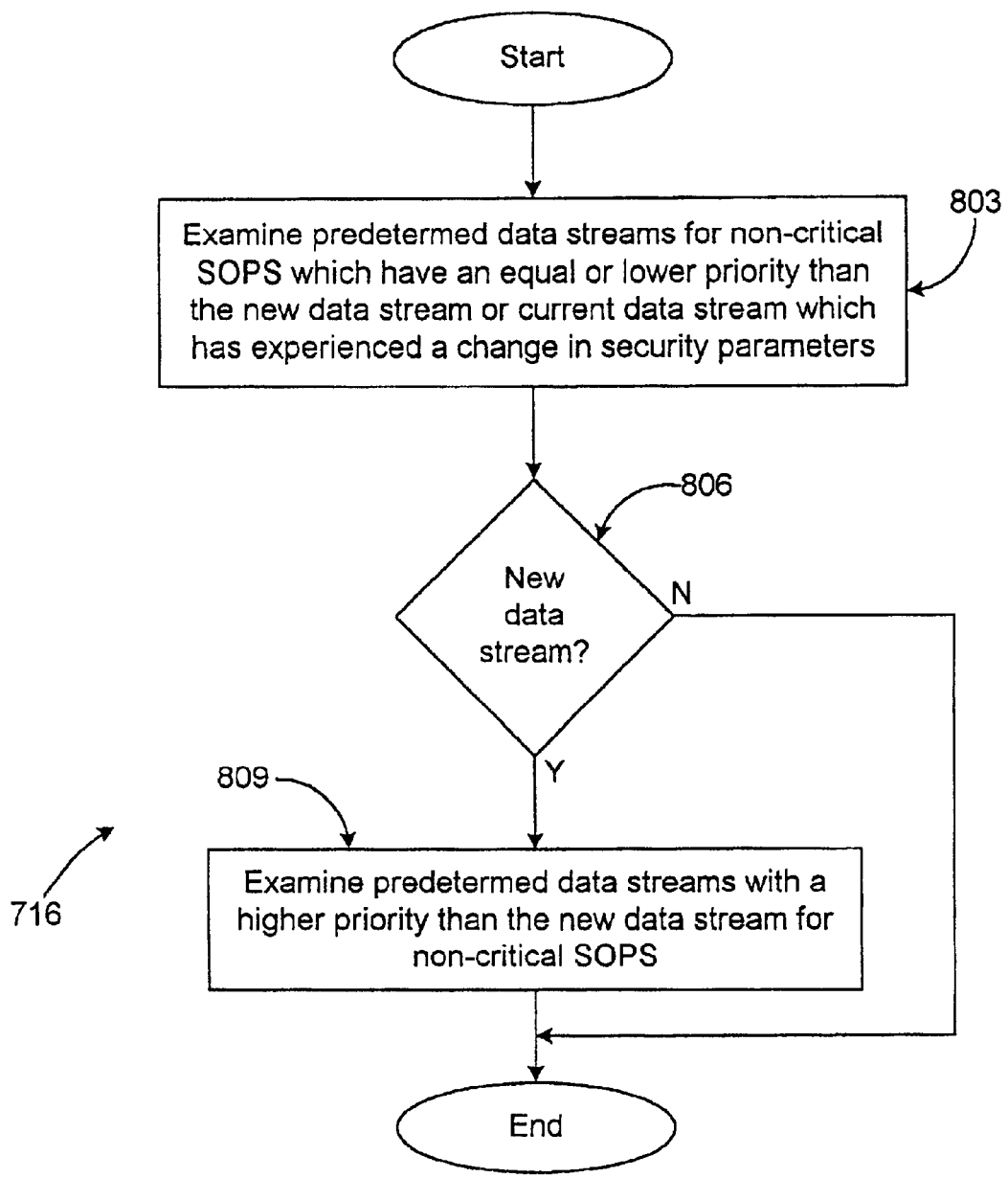
FIG. 8 is a flow chart of a SOPS identification subroutine of FIG. 7

FIG. 8 illustrates a flow chart of the non-critical SOPS identification subroutine 716. The subroutine 716 executes the logical steps taken in identifying non-critical SOPS with which to accommodate a change in security parameters of an existing data stream or to accommodate a new data stream. Beginning with block 803, the resource tracking table is consulted looking for predetermined existing data streams with a priority that is equal to or lower than the priority of the new data stream or the changed data stream are examined to determine the quantity of non-critical SOPS in each. The predetermined number of lower priority data streams may be, for example, a predefined number of data streams starting from the lowest priority up, or the predetermined number of lower priority data streams may be determined at random. The predetermined number of data streams examined may include all of the lower priority data streams if there are not too many to examine.

Next, in block 806 if a new data stream is sought to be implemented, then the subroutine 716 progresses to block 809. If a new data stream is not to be implemented in block 806, then the subroutine 716 ends. In block 809, predetermined data streams with a higher priority than the new data stream are examined for non-critical SOPS. The predetermined data streams examined may be, for example, a specific number of data streams starting from the highest priority down, or a random sampling of the higher priority data streams. The predetermined number of data streams examined may include all of the higher priority data streams if there are not too many to examine within an acceptable time period. Thereafter, the subroutine ends.

Note that both the send host authentication logic 229 and the receive host verification logic 619 of the present invention can be implemented in hardware, software, firmware, or a combination thereof. It is preferred that both the send host authentication logic 229 and the receive host verification logic 619 are implemented in software or firmware that is stored in a memory and that is executed by a suitable instruction execution system.

For the class of applications that require very short or variable length messages described in the foregoing, and/or applications whose data rate may vary, bandwidth availability becomes increasingly important. In particular, as messages get shorter, the ratio of security and control information to usable data per packet may increase. The net effect of this increase is that more information is transmitted in order to process the same amount of usable data at the receive host. Thus, more bandwidth is needed and data rate maintenance may require an increase in network bandwidth allocation. Alternatively, to achieve a similar effect in cases where it is a better choice to alter CPU resource usage instead of modifying bandwidth, the percentage of data that are authenticated can be made to decrease if data rates increase and the security computing resource allocation remains constant. This yields a potential increase in risk, i.e., the difference between a stream's target security level and its actual security level.

In the aforementioned air traffic control application, ground-to-air transmission channels often change, typically effecting a change in stream bandwidth. In order to maintain a required security level, sufficient resources must be allocated as needed for security processing at faster rates in light of potentially increased transmission rates. On the other hand, if bandwidth is decreased, either in response to user input or from switching to a lower bandwidth channel, then some processing resources can then be allocated to other applications or may be liberated as needed. This monitoring of network resource usage allows a more efficient distribution of both communications and network resource throughout all of the active applications.

In addition to channel switching, security itself may increase an application's network resource requirement because authentication requires additional information be sent within the packet header. The aforementioned per-packet ratio of security header information to message data, the "security:message ratio," can be used to quantify the effective bandwidth consumed for security operations. As user-requested security levels change, the length of the security header may increase. In many cases, increased security level leads to increased computation security processing overhead, but can also potentially lead to a greater network bandwidth requirement in the case of increased security header length. Given the same amount of information (independent of control information or security headers) to be transmitted, if messages are smaller, then this increased security:message ratio leads to more bandwidth required to transmit the same amount of data. Smaller messages require a greater number of packets, and if each packet has a security header, then a greater amount of information overall (including security header information) is required to net the same amount of usable data. Thus more security information is being transmitted, creating a greater demand for bandwidth.

From the above, it will be appreciated that, in addition to reallocation of computation resources, it might be beneficial to alternatively or additionally dynamically manage communication resources, and more particularly, transmission bandwidth, to satisfy security requirements while maintaining a high level of performance. The order in which this is done is based on application or user-specific requirements. The method described herein allows for reprioritization of bandwidth versus computing resource allocation at any point in the process or lifetime of an application.

Figure 9:
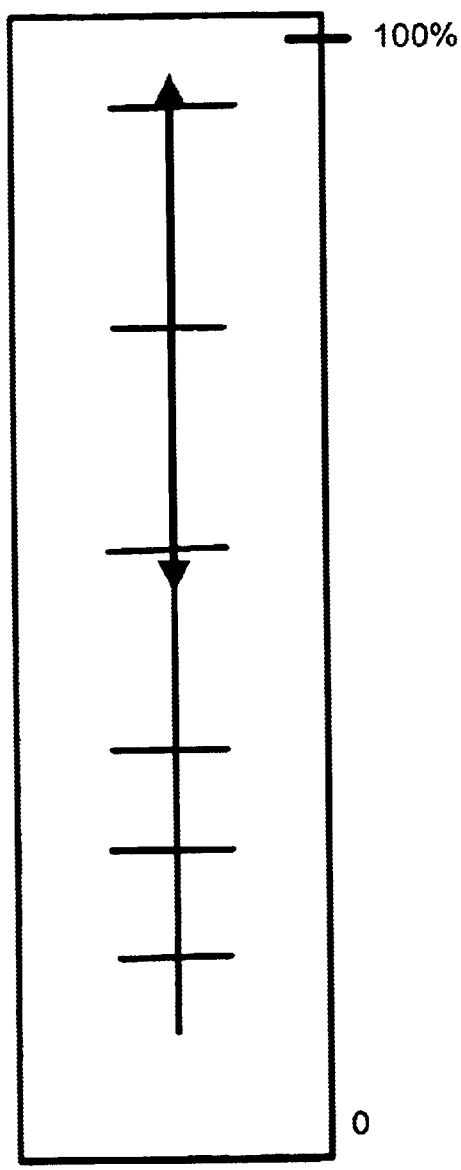
FIG. 9 is a schematic of first and second thermostats associated with a second embodiment of a data security system constructed in accordance with the principles of the present invention.
Figure 9:
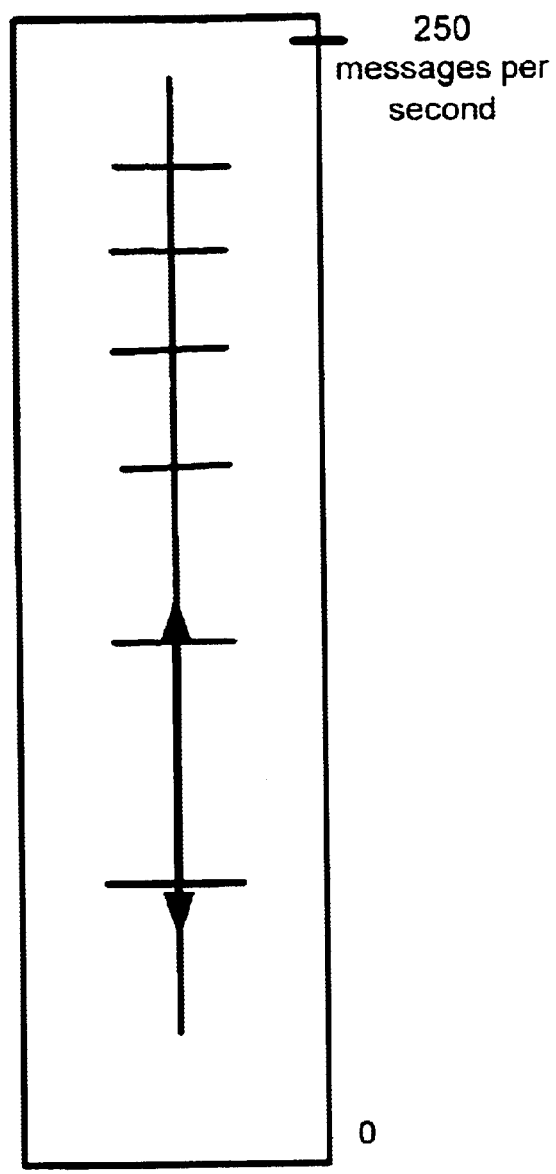

In the first embodiment described in relation to FIGS. 1–8, the security level was conceptualized in terms of a security thermostat 436 (FIG. 4). In similar manner, a packet transmission rate thermostat can be said to exist in addition to the security thermostat as a user interface for requesting network resources. This concept is illustrated in FIG. 9. As shown in this figure, the first thermostat, Thermostat 1, pertains to the security level while the second thermostat, Thermostat 2, pertains to data transmission rate, or speed. The broad line in each thermostat indicates a current specified range for each resource, and the user or application can be guaranteed sufficient computing and/or network resource allocations to maintain service within the specified ranges. Accordingly, in a second embodiment of the invention, a user may be provided with a user interface such as a display output in which both a security level thermostat and a transmission rate thermostat are included side-by-side as shown in FIG. 9.

Figure 10:
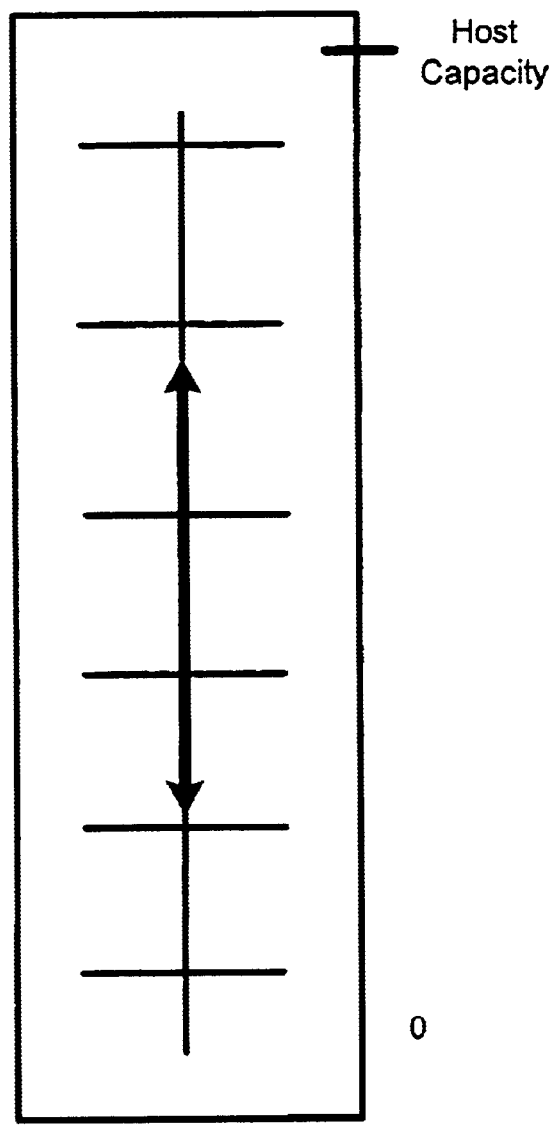
FIG. 10 is a schematic of a mapping of packet transmission rate to bandwidth.
Figure 10:
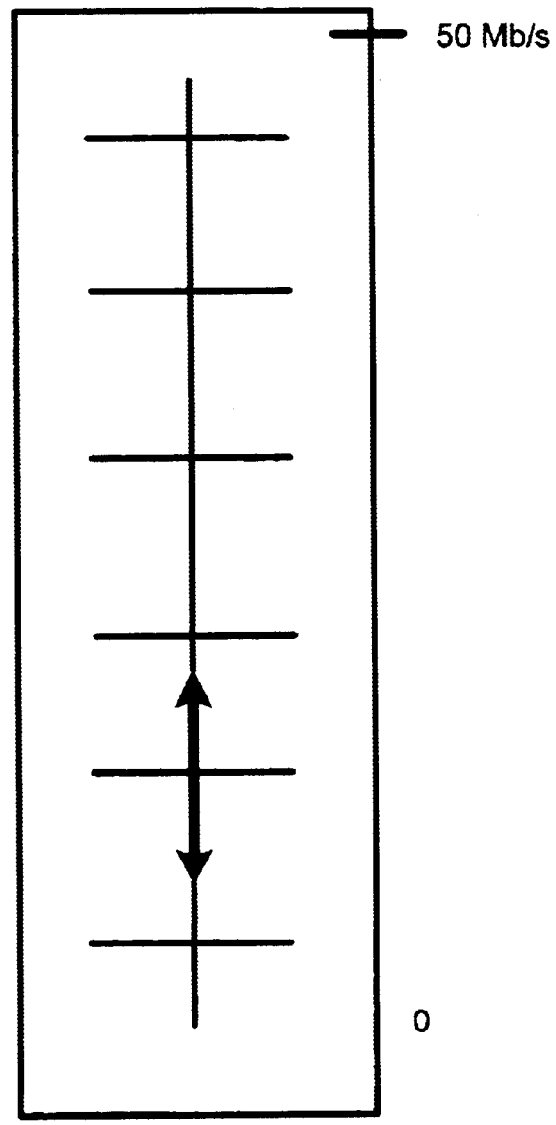

When data streams are transmitted from a send host to a receive host, the user and/or application may request to move up or down within each range on the thermostats illustrated in FIG. 9. Although the user can potentially interface with the system in terms of security level and transmission rate, integral to system adaptation are computation resources (e.g., CPU resources) and bandwidth network resources. To convert the security level and transmission rate designated by the user to useful tools for system control, these variables can be mapped to computing power and bandwidth. In particular, the adaptive security framework of the system can utilize the data from the user thermostats, to map those data to corresponding CPU and network resources, that is to say SOPS and bandwidths. A schematic representation of this mapping is provided in FIG. 10. As indicated in this figure, an internal CPU thermostat associated with security level can be established as can internal network resources thermostat associated with bandwidth. The mapping from transmission rate to bandwidth in megabits-per-second can be, for example, simply a function of packet size and packets-per-second, assuming the necessary unit conversion. Although specific thermostats are illustrated in FIGS. 9 and 10, it is to be understood that these thermostats are exemplary in nature only and that maximum transmission rates and bandwidth levels will vary on a per-application and persystem-configuration basis.

Figure 11:
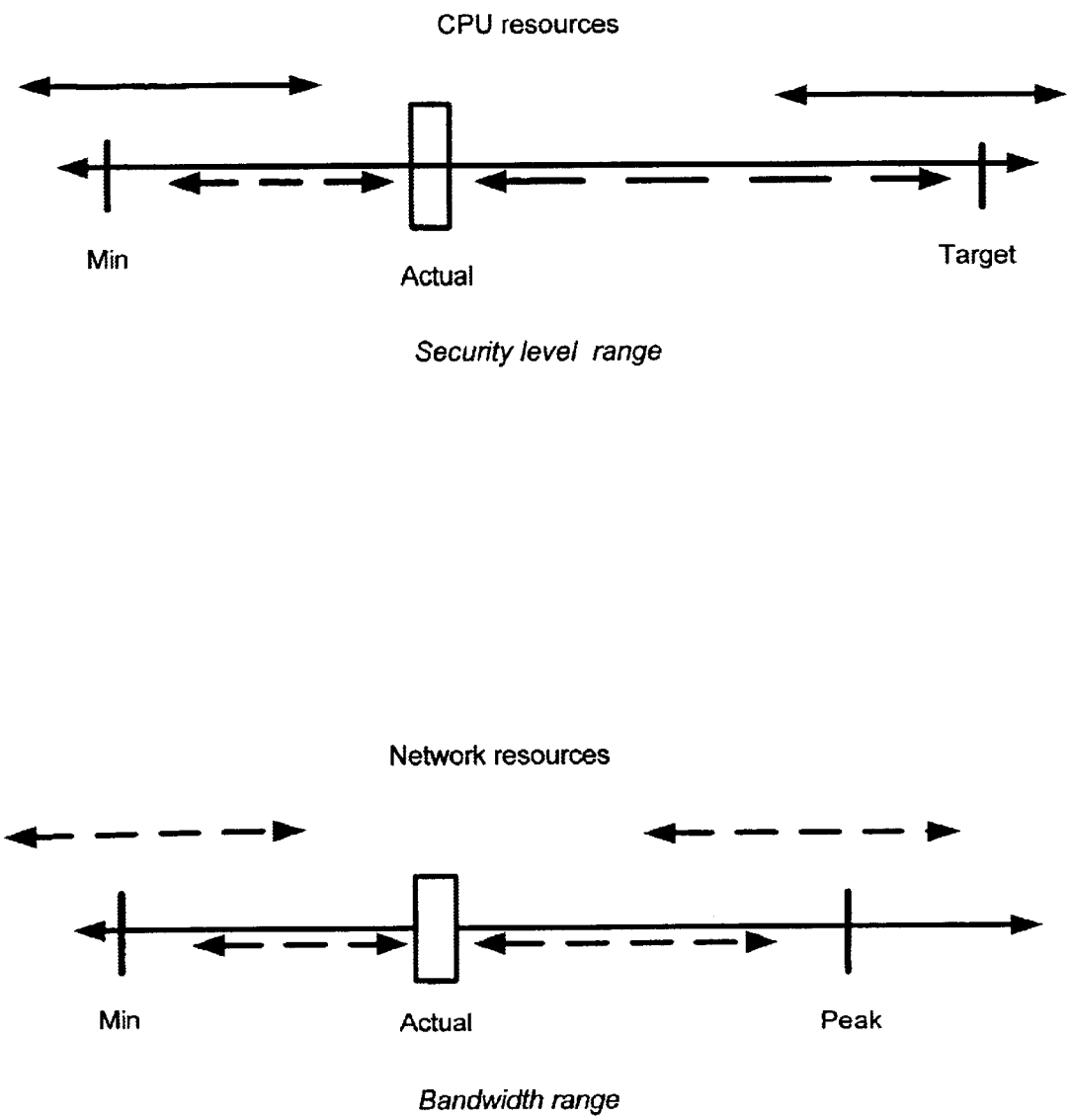
FIG. 11 is a schematic illustrating a correlation between computing and network resources.
Figure 12:
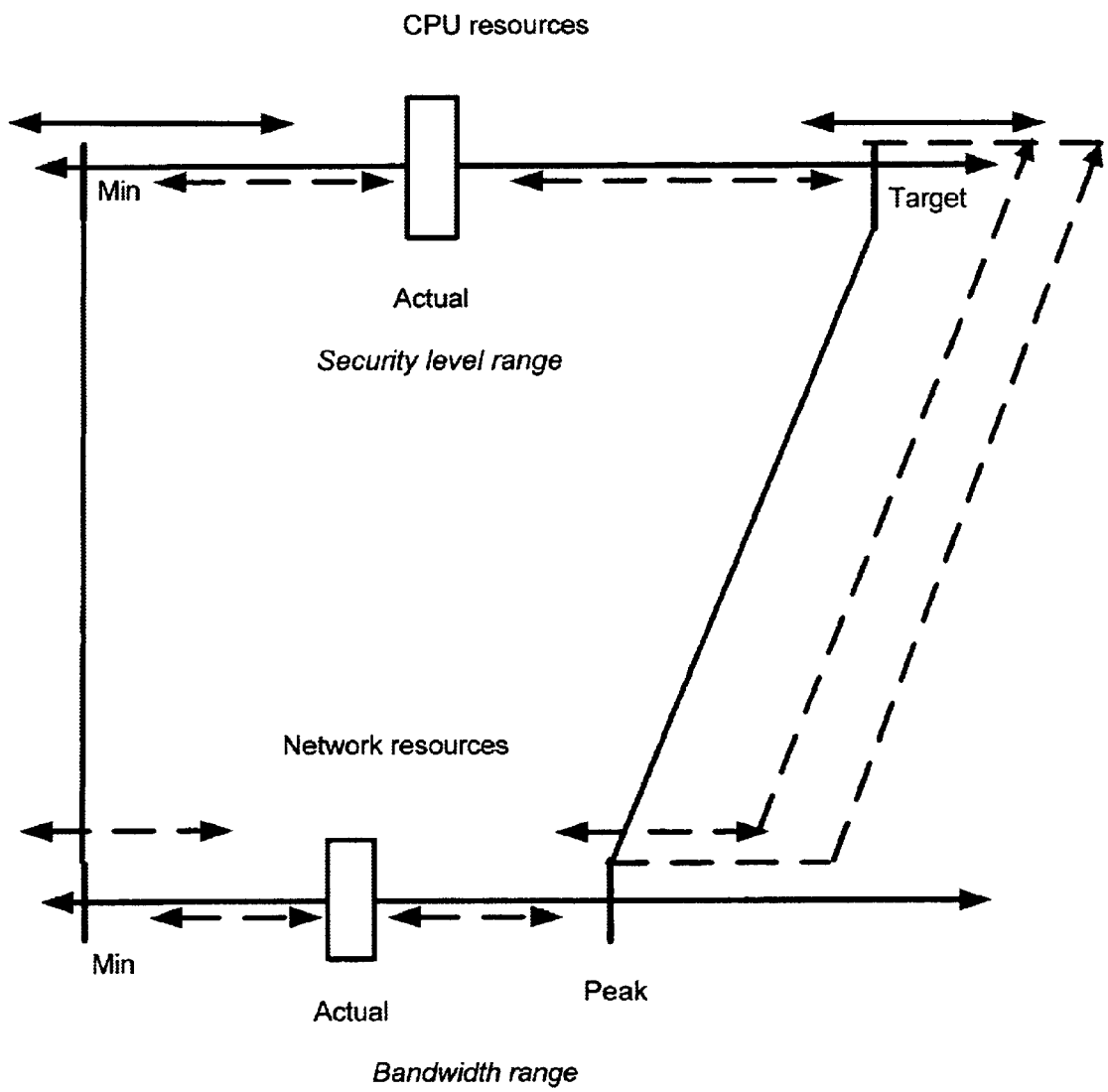
FIG. 12 is a schematic of an initial calibration between computing and network resources.

As network allocation increases, computing security resource allocation typically must also increase in order to maintain a constant risk value. As is shown in FIG. 11, feasible network and computing resource ranges are mobile, yet move together in a correlation. This correlation is dependent upon system configuration and typically must be calibrated to the particular configuration, and recalibrated when that configuration changes. An initial calibration is represented in FIG. 12. This calibration is performed to determine a base correlation between the corresponding endpoints of the two ranges on a per-system basis, before any applications are executed. In use, users can request to vary the range boundaries, and these requests can be rejected or denied based on the calibration of the resource range endpoints. This calibration can also be used to determine whether the modification of one range needs to create changes in the other range.

Once a calibration has been performed, a relationship between actual computing and communication resource allocations within the specified ranges for each resource can be determined. This relationship can then be applied to the endpoints of the ranges in cases where requested levels lie outside of current ranges. When a request would require a network resource range's maximum point to increase, if sufficient network resources do not exist, then resources can be obtained by using dynamic resource reservation managing (DRRM) to facilitate a renegotiation with the network (e.g., ATM AAL5) to obtain any additional resources required. If the network level request cannot be granted, the DRRM will inform the adaptive security resource heuristics and the request to extend the network resource range will be denied.

FIG. 13 provides a flow chart which demonstrates the use of both computation and communication resources in an effort to maintain a desired level of security. As discussed in the following, this flow chart provides only one example implementation of the system and method of the second embodiment and therefore is in no way intended to limit the scope of the invention. At block 900, the receive host awaits a steam of data to be sent to it from a send host. Once a stream of data, for example, a stream of video frames, is sent to the receive host, as indicated at block 902, the security level and transmission rate of the stream are determined, as indicated at block 904. This determination can be made through monitoring in a manner known in the art. By way of example, the monitored data stream may have a security level of 70 and a data transmission rate of 100 megabits/sec. In accordance with the foregoing, each of these values could have been selected by the user through adjustment of the security level and the transmission rate thermostats.

As previously described, the available computation resources (e.g., CPU power) typically are calibrated with transmission speed upon system initiation. In addition, an initial computation capacity of the receive host can be determined prior to receiving a steam of data. However, as the receive host system resources are utilized to run local applications and/or receive other streams of data, this capacity for computation can change. Therefore, after the security level and transmission rate of the stream have been determined, the system can determine the current computation resources of the receive host, as in block 906. Although this step is described as taking place after evaluation of the stream requirements, it will be understood that this step could, alternatively, be preformed prior thereto.

Once both the requirements of the stream and the availability of the receive host are evaluated, they can be compared to determine whether the receive host has sufficient computation capacity for the data stream, as indicated in 908. If sufficient computation resources are available, operation proceeds to block 910 in which the required security operations are performed and the data is made available to the receive host. At this point, flow can return to block 900 in which the receive host again awaits the transmission of a data stream. If, on the other hand, sufficient computation resources are not available, operation proceeds to 912 where it is determined whether there are sufficient computation resources available for reallocation so that the data steam can be properly processed. In one aspect of the invention, the basis upon which it is determined whether computation resources are available for reallocation can be configured by the user. Specifically, a reallocation hierarchy can be developed in which the various applications and streams are prioritized with respect to one another. For example, if the receive host were a server for a business, the priority could be established in accordance with the rank of the employee which is using the application or to which the stream is directed. Alternatively, the priority could be established in accordance with the level of security deemed necessary for the subject data, and so forth.

If sufficient resources are available for reallocation to process the data stream in accordance with the established prioritization scheme, the receive host then reallocates these computation resources, as indicated in block 914. However, if there are not adequate computation resources available, the system then evaluates the potential for communication resources, as indicated in block 916. By way of example, the system could determine the bandwidth of the data stream and, in view of the computation resources available and the security level desired, determine whether the bandwidth could be adjusted to permit the data steam to be processed in the intended manner.

The system then determines whether there are adequate communication resources available for reallocation, as indicated in 918. Since bandwidth is a function of both data transmission rate and data size, the bandwidth could be adjusted by adjusting either of these parameters. Therefore, in keeping with the example provided above, the transmission rate of the stream of video frames could be slowed to 50 megabits/sec to better match the speed of the data transmitted to the receive host with the receive host computation capacity. Alternatively, the transmission rate could be left unaltered and the size of the data portions of each data packet within the stream increased in size such that the security:message ratio is reduced to a level which the receive host can maintain. Additionally, both transmission rate and data size could be altered to obtain the desired result.

As with the computation resource allocation, communication reallocation can be determined in accordance to a predetermined priority. Therefore, communication resources allocated to sending various different streams to the receive host can be pulled according to a specified hierarchy. In that reallocation operations generally require a large amount of computing overhead, it is typically advisable to minimize the number of reallocation operations performed upon the communication resources. Therefore, it may be preferable to borrow a relatively large amount of resources from a relatively small number of streams as opposed to borrowing a relatively small amount of resources from a relatively large number of streams.

If there are not adequate communication resources available for reallocation, operations can proceed back to block 906 in which the current computation resources of the receive host are evaluated to determine whether new resources have become available. Therefore, in this example, flow can continue in a loop from block 906 and back again until sufficient resources, either computation or communications, are located. If there are sufficient communication resources available for reallocation, reallocation is conducted in accordance with a predetermined priority, as indicated in block 920. From there, operations proceed to block 910 in which the required security operations are performed and the data is made available to the receive host. Therefore, it can be appreciated that the second embodiment implements the systems and methods of the first embodiment, and further provides another variable which the system can adapt to ensure secured transmissions.

From this example, it can be seen that computation resources are utilized before communication resources. This order of operations is preferred in that, as a general matter, it is more difficult to control communication resources than computation resources because communication resources (i.e., bandwidth) is subject to fluctuations beyond the control of the system (e.g., delays within a network). However, it is to be understood that adjustment of communication resources can be used prior to adjustment of computation resources, if desired.

As described with respect to the first embodiment, security operations conducted by the system can be quantified in terms of security operations per second (SOPS). The operation of the second embodiment shown in FIG. 13 therefore can similarly be conceptualized in terms of SOPS. In that the SOPS required for providing the security desired for a particular stream is both a function of the security level requested and bandwidth, this value can be altered according to the second embodiment through varying the bandwidth in the manner described above. Therefore, when a stream is transmitted to the receive host as in block 902, the system can determine the SOPS required for the stream (904) and compare this value with the SOPS available from the receive host (906). Then, as in the discussion of FIG. 13, the system can first evaluate/adjust the SOPS capacity of in terms of computation resources (908–914) before turning to adjustment of the SOPS for the stream (916–920).

In the foregoing discussion, changes in communication resources are described as being made proactively in order to maintain a desired level of security. However, it will be understood that, these resources may change independently. In such a situation, the same principles described above apply. Because each of the security level, computing power, and bandwidth variables can be adjusted to obtain a desired result, alteration of one of the variables, whether intentional or not, can be compensated for or utilized to provide an advantageous result. For instance, if bandwidth were to increase across a particular network, receive host computation resources could be reallocated to keep pace with the increased speed and amount of data being received. Similarly, if computation resources were to become available, bandwidth could be increased to more quickly provide the desired data. If bandwidth were to decrease, security level could, for example, be increased if not already at the target level. Also, if security level requirements suddenly increase, both bandwidth could be decreased and allocated computation resources increased to ensure compliance with the higher levels of security desired. Therefore, it can be appreciated that through the present method, nearly limitless adjustments and adjustment combinations can be made to tailor system performance to suit user requirements.

The versatility of the invention can be appreciated in view of the following cases which comprise a set of scenarios which are representative of typical application situations that require dynamic reallocation of computation and communication resources to minimize overall risk.

Case 1: Requested increase in level of security and no requested change in bandwidth. When there is an increase in the level of security within the pre-specified security level range, an increase in computation security resource consumption may trigger a decrease in bandwidth in order to decrease the data rate to remove load from the CPU. Decreasing the data rate can be used as a tool to maintain security level, because, if information is arriving more slowly, the fewer CPU cycles are required to perform perpacket security operations. Note also that a decrease in data rate makes more bandwidth available to other streams, demonstrating the inter-stream relationship that exists with both computation and communication resource usage.

Upon receiving a request for an increased security level, the system can calculate, based on the new request and the current bandwidth, a SOPS requirement to grant the request. If the SOPS are not available at the requesting host, then the CPU resource reallocation heuristics determine the optimal method by which to reallocate computing resources. Next, dynamic authentication may have to be used, in order to achieve the security level with the new CPU resource allocation in the event that the new CPU allocation does not provide sufficient SOPS to grant the request. It is important to note that an increase in security level may actually prompt an increase in bandwidth, as dynamic authentication may invoke a change from percentage based authentication to delayed authentication, the latter using fewer SOPS than the former yet requiring higher reliability.

Since the heuristics of the present invention prioritize the provision of the requested level of security over that of bandwidth, it is only after the new SOPS allocation has been determined that bandwidth is selected, based on the correlation described in the foregoing. If the new bandwidth is within the specified network resource range but is not available, then the entire request, including the security level increase, is denied. If the new bandwidth can be granted, then it is granted, whether or not is within the network resource range. If the new bandwidth level exceeds the network resource range and cannot be granted, due to lack of available network resources, then the request is denied.

If the new bandwidth level is within the specified range and cannot be granted due to lack of available network resources, then this raises an exception. There exist two choices: either the request can be denied, or the DRRM functions can be used to renegotiate with the network-level reservation protocol to acquire more bandwidth within the user-level "fat pipe." In addition, if we have the option to decrease bandwidth (the application is running, for example, at the top of its bandwidth range), then this option will help to stretch the available SOPS to provide a greater level of security.

In analyzing the effectiveness of an adaptive security system, it is helpful to consider a security factor which is the algorithm, level/frequency desired for security which, if multiplied by the number of packets transmitted per second (numpackets factor), would provide a SOPS figure. If the security factor is increased, and the SOPS allocation remains unchanged, then the numpackets factor must decrease. For numpackets to decrease, the data rate and the packet size ratio must decrease. This would involve either lower bandwidth usage and with an unchanged packet size, or a greater packet size. If security headers increase in size and create the need for more individual packets to transmit the same amount of data, then numpackets increases.

Case 2: Requested decrease in level of security and no requested change in bandwidth. A decrease in CPU resource consumption may allow an application to increase data rate, within the bandwidth range if fixed or exceeding the range if mobile, although this is not required. An increase in data rate is reasonable because, while fewer CPU resources are being used for security, the processor may be able to handle a higher data rate.

Note that an increase in security level does not always lead to an increase in security factor, which is a function of not only security level, but also of algorithm and authentication heuristic. In certain cases, such as a switch from the percentage based to the delayed authentication heuristic, security factor may actually decrease, and thus SOPS will decrease. This is an opportunity for increasing bandwidth for the stream, if desired, so long as the SOPS capacity is maintained for the given system configuration. A decrease in the level of security will lower the security factor, again allowing bandwidth to be increased if desired. If a change in the level of security would exceed the security level range, then the above decision heuristics can still be applied, but the new range would have to honor the security level and bandwidth range correlation.

Case 3: Requested increase in bandwidth and no requested change in level of security. Consider the case in which an application requests to change the bandwidth it is using. A sample scenario in which a bandwidth change is imperative occurs with applications, such as those discussed for use in aviation environments, that require the ability to switch to communication channels of various bandwidths. Suppose the only channel available to a stream is of higher bandwidth than can be maintained by the stream's current security status. This can lead to increased risk if the computation resources are not used more efficiently through some resource reallocation or application of dynamic authentication heuristics. Therefore, joint dynamic allocation of CPU and network resources should be responsive to bandwidth requests as well, as they indirectly affect the level of security which can be offered and further demonstrate the relationship between the two types of resources. Cases if increased key sizes or demand for greater network reliability for delayed authentication using a very large packet group size are often triggers for bandwidth modification requests.

A requested bandwidth increase (or switch to a high-bandwidth channel), within the pre-specified bandwidth range, would increase numpackets. With no change in security factor, this would yield an increased SOPS requirement. First, system heuristics would calculate whether or not bandwidth was available in the "fat pipe" to honor the request. If the bandwidth is not available, even through "borrowing" from other streams, then the request is denied. Next, if the bandwidth requirement could be met, then the heuristics would calculate new SOPS requirement that correlate to the bandwidth request. If the security level cannot be kept within the specified range with the new bandwidth request, then the CPU resource reallocation heuristics would determine if SOPS could be reallocated to accommodate the request.

If the level of security can be modified within the specified range, and if the security level can be sufficiently lowered within the acceptable range to lower the SOPS requirement with the increased numpackets, then the request for increased bandwidth is accepted. If the bandwidth increase cannot be accomplished without lowering the level of security such that it would be below the security level range minimum, then the bandwidth increase request is denied. In that security level takes priority over bandwidth in this implementation, bandwidth requests are not granted if they compromise security. This order of priority is a parameterized option, and can be switched, if desired, allowing bit rate to take priority over security.

Due to the interrelationship between computation and resources, a change in network bandwidth may also be triggered by a change in external load on a host. From the viewpoint of network resource reallocation heuristics, a change in CPU resource availability is identical to a requested change, with the exception that there exists no option to deny the request.

Case 4: Requested decrease in bandwidth and no requested change in level of security. The case of a bandwidth decrease may not be specifically requested, because each stream's transmission rate is policed, so as not to exceed it's allocation. If a stream wishes to use less than it's allocation, then this is acceptable. However, if the user or application specifies this decrease via the transmission rate thermostat, then the joint resource reallocation heuristics can use this information to quantify the newly-available bandwidth allotment and then redistribute that bandwidth to streams over connections within the "fat pipe" that may be running at the very bottom (within some parameterized threshold) of their specified transmission rate ranges.

The flow charts of FIGS. 3, 7, 8, and 13 show the architecture, functionality, and operation of a possible implementation of the adaptive security software employed by the send host 103 (FIG. 2) and the receive host 106 (FIG. 6). In this regard, each block represents a module, segment, or portion of code, which comprises one or more executable instructions for implementing the specified logical function (s). It should also be noted that in some alternative implementations, the functions noted in the blocks may occur out of the order noted in FIGS. 3, 7, 8, and 13. For example, two blocks shown in succession in FIGS. 3, 7, 8, and 13 may in fact be executed substantially concurrently or the blocks may sometimes be executed in the reverse order, depending upon the functionality involved, as will be further clarified hereinbelow.

In addition, the send host authentication logic 229 (FIG. 3) and the receive host verification logic 619 (FIGS. 7 and 8), each of which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

We claim:

1. A method for applying adaptive security to a data stream, comprising the steps of:
   identifying a desired security level range and a desired actual security level which falls within the desired security level range for communicating a data stream from a send host to a receive host;
   determining an actual security level in the receive host based upon the availability of a number of security processor operations;
   communicating the actual security level from the receive host to the send host;
   generating a plurality of data packets associated with the data stream in the send host, the data packets having an authentication header including the desired security level range and the actual security level;
   reallocating computing resources at the receive host if data packets cannot be verified at the desired actual security level with a current allocation of resources; and
   verifying the data packets at the actual security level, the actual security level being within the desired security level range.

2. The method of claim 1, further comprising the step of altering the actual security level in the send host using a security level thermostat.

3. The method of claim 1, wherein the step of reallocating computing resources at the receive host comprises identifying the availability of a number of security operations per second (SOPS) employed in non-critical operations at the receive host and reallocating these SOPS for processing the data stream.

4. The method of claim 1, further comprising the step of determining the bandwidth of the data stream being sent from the send host to the receive host.

5. The method of claim 4, further comprising the step of reallocating communication resources if there are insufficient computing resources available for reallocation at the receive host.

6. The method of claim 5, wherein the step of reallocating communication resources comprises adjusting the bandwidth of the data stream.

7. The method of claim 6, further comprising the step of identifying the number of security operations per second (SOPS) that will be required to process the data stream and comparing this number with the number of SOPS available at the receive host to determine the amount of bandwidth adjustment needed.

8. The method of claim 6, wherein the bandwidth is adjusted by decreasing data transmission rate.

9. The method of claim 6, wherein the bandwidth is adjusted by increasing a data portion of the data packets to lower a security:message ratio of the data packets.

10. The method of claim 6, further comprising the step of calibrating the computing resources with the communication resources.

11. A method for communicating and applying adaptive security to a data stream comprising a plurality of data packets, comprising the steps of:
    identifying a desired security level range and a desired actual security level which falls within the desired security level range for the data stream to be received by a host;
    determining the availability of a number of security processor operations at the host;
    reallocating computing resources at the host if the data stream cannot be verified at the desired actual security level;
    reallocating communication resources if there are insufficient computing resources available for reallocation at the host; and
    verifying the data packets at the actual security level, the actual security level being within the desired security level range.

12. The method of claim 11, wherein the step of reallocating computing resources at the host comprises identifying the availability of a number of security operations per second (SOPS) employed in non-critical operations at the host and reallocating these SOPS for processing the data stream.

13. The method of claim 11, wherein the step of reallocating communication resources comprises adjusting the bandwidth of the data stream.

14. The method of claim 13, further comprising the step of identifying the number of security operations per second (SOPS) that will be required to process the data stream and comparing this number with the number of SOPS available at the receive host to determine the amount of bandwidth adjustment needed.

15. The method of claim 13, wherein the bandwidth is adjusted by decreasing data transmission rate.

16. The method of claim 13, wherein the bandwidth is adjusted by increasing a data portion of the data packets to lower a security:message ratio of the data packets.

17. The method of claim 11, further comprising the step of calibrating the computing resources with the communication resources.

18. A system for facilitating data communication to a host with adaptive security, comprising:
    means for determining whether a desired actual security level for a transmitted data stream falls within a desired security level range;
    means for determining the availability of a number of security processor operations at the host;
    means for reallocating computing resources at the host if the data stream cannot be verified at the desired actual security level; and
    means for reallocating communication resources if there are insufficient computing resources available for reallocation at the host.

19. The system of claim 18, wherein the means for determining the availability of a number of security processor operations comprises means for determining a processor time availability by examining a resource tracking table for a non-critical processor time usage of at least one existing data stream.

20. The system of claim 18, wherein the means for determining the availability of a number of security processor operations comprises means for identifying the availability of a number of security operations per second (SOPS) employed in non-critical operations at the host and reallocating these SOPS for processing the data stream.

21. The system of claim 18, wherein the means for reallocating communication resources comprises means for adjusting the bandwidth of the data stream.

22. The system of claim 21, wherein the means for adjusting the bandwidth of the data stream comprises means for decreasing the data transmission rate.

23. The system of claim 21, wherein the means for adjusting the bandwidth of the data stream comprises means for increasing a data portion of data packets of the data stream to lower a security:message ratio of the data packets.

24. The system of claim 18, further comprising means for calibrating the computing resources with the communication resources.

25. A computer program embodied on a computer-readable medium for facilitating data communication to a host with adaptive security, comprising:

logic configured to determine whether a desired actual security level for a transmitted data stream falls within a desired security level range;

logic configured to determine the availability of a number of security processor operations at the host;

logic configured to reallocate computing resources at the host if the data stream cannot be verified at the desired actual security level; and logic configured to reallocate communication resources if there are insufficient computing resources available for reallocation at the host.

26. The computer program of claim 25, wherein the logic configured to determine the availability of a number of security processor operations comprises logic configured to determine a processor time availability by examining a resource tracking table for a non-critical processor time usage of at least one existing data stream.

27. The computer program of claim 25, wherein the logic configured to determine the availability of a number of security processor operations comprises logic configured to identify the availability of a number of security operations per second (SOPS) employed in non-critical operations at the host and reallocate these SOPS available for processing the data stream.

28. The computer program of claim 25, wherein the logic configured to reallocate communication resources comprises logic configured to adjust the bandwidth of the data stream.

29. The computer program of claim 28, wherein the logic configured to adjust the bandwidth of the data stream comprises logic configured to decrease the data transmission rate.

30. The computer program of claim 28, wherein the logic configured to adjust the bandwidth of the data stream comprises logic configured to increase a data portion of data packets of the data stream to lower a security:message ratio of the data packets.

31. The computer program of claim 25, further comprising logic configured to calibrate the computing resources with the communication resources.

* * * * *

UNITED STATES PATENT AND TRADEMARK OFFICE
CERTIFICATE OF CORRECTION

PATENT NO. : 6,865,426 B1
DATED : March 8, 2005
INVENTOR(S) : Phyllis A. Schneck et al.

It is certified that error appears in the above-identified patent and that said Letters Patent is hereby corrected as shown below:

<u>Title page,</u>
Item [63], Related U.S. Application Data, please add -- Continuation of application No. 09/181,304, filed on Oct. 28, 1998, now Pat. No. 6,108,583. --

Signed and Sealed this

Twenty-eighth Day of June, 2005

JON W. DUDAS
*Director of the United States Patent and Trademark Office*